(12) United States Patent
Chaudhary et al.

(10) Patent No.: US 11,318,438 B2
(45) Date of Patent: May 3, 2022

(54) ADVANCED PROCESS CONTROL IN A CONTINUOUS CATALYTIC REGENERATION REFORMER

(71) Applicant: BHARAT PETROLEUM CORPORATION LIMITED, Maharashtra (IN)

(72) Inventors: Kondapalli Shreya Chaudhary, Mumbai (IN); Shashi Kant Shukla, Mumbai (IN); V Suresh, Mumbai (IN); Susanta Sadhukhan, Mumbai (IN); Jitendra Kumar Verma, Mumbai (IN)

(73) Assignee: BHARAT PETROLEUM CORPORATION LIMITED, Mumbai (IN)

( * ) Notice: Subject to any disclaimer, the term of this patent is extended or adjusted under 35 U.S.C. 154(b) by 3 days.

(21) Appl. No.: 17/042,749

(22) PCT Filed: May 16, 2018

(86) PCT No.: PCT/IB2018/053403
§ 371 (c)(1),
(2) Date: Sep. 28, 2020

(87) PCT Pub. No.: WO2019/186250
PCT Pub. Date: Oct. 3, 2019

(65) Prior Publication Data
US 2021/0016240 A1    Jan. 21, 2021

(30) Foreign Application Priority Data
Mar. 29, 2018  (IN) .............................. 201821011998

(51) Int. Cl.
*B01J 19/00*       (2006.01)
*B01J 8/00*        (2006.01)
(Continued)

(52) U.S. Cl.
CPC .......... *B01J 19/0033* (2013.01); *B01J 8/001* (2013.01); *B01J 38/02* (2013.01); *B01J 38/44* (2013.01);
(Continued)

(58) Field of Classification Search
CPC ........ B01J 8/001; B01J 19/0033; B01J 38/02; B01J 38/44; C10G 35/04; C10G 35/24
See application file for complete search history.

(56) References Cited

U.S. PATENT DOCUMENTS

| 3,497,449 A | 2/1970 | Urban |
| 3,733,476 A | 5/1973 | Hopkins et al. |

(Continued)

OTHER PUBLICATIONS

Enrico Caricato, et. al.\. "Catalytic Naphtha Reforming: A Novel Control System for the Bench-Scale Evaluation of Commercial Continuous Catalytic Regeneration Catalysts" May 2017.
(Continued)

*Primary Examiner* — Brian A McCaig
(74) *Attorney, Agent, or Firm* — Maschoff Brennan

(57) ABSTRACT

The present invention relates to an advanced process control system (APC) for a continuous catalytic regeneration reformer with master-slave configuration to control coke on spent catalyst while maximizing heavy reformate octane barrel using online inferential, both for coke content of spent catalyst and octane of heavy reformate. Further, the present invention relates to provide an APC system for a continuous catalytic regeneration reformer with master-slave configuration, which comprises of a master APC, a reactor APC, and a regenerator APC, wherein, the reactor APC and the regenerator APC are linked to the master APC.

20 Claims, 14 Drawing Sheets

(51) Int. Cl.
  *B01J 38/02* (2006.01)
  *B01J 38/44* (2006.01)
  *C10G 35/04* (2006.01)
  *C10G 35/24* (2006.01)

(52) U.S. Cl.
  CPC ............ *C10G 35/04* (2013.01); *C10G 35/24* (2013.01); *B01J 2219/00049* (2013.01); *C10G 2300/1096* (2013.01); *C10G 2300/4081* (2013.01)

(56) References Cited

U.S. PATENT DOCUMENTS

| | | |
|---|---|---|
| 5,034,117 A | 7/1991 | De Bonneville |
| 5,298,155 A | 3/1994 | Sabottke |
| 7,291,311 B2 | 11/2007 | Sanchez |
| 8,815,201 B2 | 8/2014 | Lew |
| 9,701,914 B2 | 7/2017 | Khan |
| 2004/0099572 A1 | 5/2004 | Evans |
| 2005/0261534 A1 | 11/2005 | Stell et al. |
| 2008/0128325 A1 | 6/2008 | Khan |
| 2010/0152021 A1 | 6/2010 | Lew |
| 2018/0046155 A1 | 2/2018 | Horn et al. |

OTHER PUBLICATIONS

P. Banerjee, et al., "Implementing and maintaining advanced process control on continuous catalytic reforming" Oct. 2009.
Grzegorz Oleszczuk et al. "Advanced process control in FCC and hydrocracking units", Honeywell Advanced Solutions, PTQ Q2 2015, 6 pages.

ADVANCED PROCESS CONTROL IN A CONTINUOUS CATALYTIC REGENERATION REFORMER

FIELD OF THE INVENTION

The present invention relates to an advanced process control system for a continuous catalytic regeneration reformer where a reactor advanced process controller and a regenerator advanced process controller are linked to a master advanced process controller.

BACKGROUND OF THE INVENTION

A typical process unit has a certain basic process controls which are designed and built, to facilitate basic operation, control and automation requirements. These process controls encompass stand-alone flow, level, pressure and temperature loops and are typically called closed loops in a Distributed Control System (DCS). An advanced process control (APC) takes many such standalone loops into a single control execution environment. Also APC is capable of taking open loops into the same control environment.

In a typical continuous catalytic regeneration (CCR) reformer, octane of naphtha (IBP-180° C. cut hydrocarbon) feed is augmented to meet the requirement of the refinery gasoline pool. The CCR process also involves a continuous circulation or movement of the catalyst from the reactors to the regenerator, back to the reactors and so on. During this continuous circulation, the catalyst changes atmosphere from hydrogen-hydrocarbon, to small amount of oxygen in a nitrogen carrier gas for carbon burn, higher oxygen for proof burn, and much higher oxygen to re-disperse the noble metals in a high chloride environment. Therefore, catalyst regeneration in a reforming unit is a multi-interactive system and it is possible to control it. However, consistent optimization of the catalyst regeneration is humanly an impossible task.

U.S. Pat. No. 7,291,311B2 describes an improvement in operation of catalyst circulation to make the function of the regeneration zone more stable and safer, and also to improve the overall performances by anticipating deviations, will be able to function with a lower average amount of coke deposited on the catalyst. Further, the patent describes automatic control of combustion zone in a catalyst reforming or fluidized bed process.

U.S. Pat. No. 9,701,914B2 describes an advanced control of severe fluid catalytic cracking process for maximizing propylene production from petroleum. However, the patent does not describe implementation of the advanced control system for catalyst regeneration.

*Catalytic Naphtha Reforming: A Novel Control System for the Bench-Scale Evaluation of Commercial Continuous Catalytic Regeneration Catalysts*; Enrico Caricato, et. al.; Sasol group, describes an automated control system for the bench-scale evaluation of CCR naphtha reforming catalysts. The literature describes that a multivariate model between heater temperatures and catalyst bed temperatures was constructed and an APC loop was designed for setting desired catalyst bed temperatures during the tests.

*Implementing and maintaining advanced process control on continuous catalytic reforming*; P. Banerjee, et. al; Process Control and Information Systems-Special Report describes implementation of APC to control coke on spent catalyst while maximizing heavy reformate octane barrel using online inferential. Further, the literature describes the implementation of APC in reaction and regeneration section separately.

Although literature indicates that it is possible to optimize unit operation by using APC, the same has not been implemented on a full-fledged scale in a CCR reformer. Moreover, the concept of the APC of the reaction and regeneration section of a CCR reformer working together in know-how of each-other's moves is not known in the prior-art. The working of the APCs of the reaction and the regeneration section in conjunction with each other helps one controller to plan and execute controls to combat the other controller's action therefore controlling the process, right at the desired limit.

Therefore, there was a need of an APC which would optimize each and every aspect of regeneration and reaction section in a CCR reformer inclusive of control of coke on spent catalyst. Typically, a CCR reformer would have an APC which would maintain octane of main product from unit, heavy reformate, by manipulating operating severity i.e. reactor inlet temperatures.

SUMMARY OF THE INVENTION

The present invention as embodied and broadly described herein discloses use of master-slave (M-S) concept, within an advanced process controller (APC) design to control coke on spent catalyst while maximizing heavy reformate octane barrel using online inferential, both for coke content of spent catalyst and octane of heavy reformate. As coke on spent catalyst is also dependent upon the feed quality and operating conditions of the reformer reactor section, an entity comprising of a master-slave configuration within the CCR reformer APC is also incorporated in the present invention.

Accordingly, an aspect of the present invention is to provide an APC system for a continuous catalytic regeneration (CCR) reformer comprising of a M-S configuration, which further comprises a master APC, a reactor APC, and a regenerator APC, wherein, the reactor APC and the regenerator APC are linked to the master APC.

In the prior art, the controller would not observe the effect of manipulation of reactor severity on the coke content of spent catalyst. Unlike the typical, the APC of the present invention are designed to maximize octane barrel of heavy reformate while maintaining the coke on spent catalyst. All possible constraints have been incorporated within the APC so that they are robust, do not require manual intervention to look at any aspect of the process, making them sustainable. Manipulation of a number of variables, by APC, provides more degrees of freedom to control the process within the operating window.

Further, interlocks have been incorporated in the present invention in order to build in intelligence within the APC, to take conducive action, to avoid reverse action, to change the control from supervisory to supervisor in case of plant exigencies. Furthermore, for the purpose of implementing APC in a CCR reformer, a number of small advanced process controllers have been conceived instead of one big one. This avoids the possibility of all the process parameters being out of the control window, at the same time, in case of any erroneous indication/any section of the plant being upset or shut down.

To further clarify the advantages and features of the present invention, a more particular description of the invention will be rendered by reference to specific embodiments thereof, which is illustrated in the appended drawings. It is appreciated that these drawings depict only typical embodiments of the invention and are therefore not to be considered limiting of its scope. The invention will be described and explained with additional specificity and detail with the accompanying drawings.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

It should be understood at the outset that although illustrative implementations of the embodiments of the present disclosure are illustrated below, the present invention may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Any particular and all details set forth herein are used in the context of some embodiments and therefore should NOT be necessarily taken as limiting factors to the attached claims. The attached claims and their legal equivalents can be realized in the context of embodiments other than the ones used as illustrative examples in the description below.

The present invention relates to an advanced process control (APC) system for a continuous catalytic regeneration (CCR) reformer where a reactor APC and a regenerator APC are linked to a master APC. Further, the present invention relates to the application of APC systems to CCR reformer in order to maximize octane barrel of heavy reformate while maintaining the coke on spent catalyst.

In accordance with an embodiment of the present invention, an APC system for a CCR reformer comprising of a master-slave configuration (M-S configuration), wherein the M-S configuration comprises of a master APC, a reactor APC, and a regenerator APC, and wherein the reactor APC and the regenerator APC are linked to the master APC.

A general CCR reforming process involves:
a. reforming of a hydrocarbon feed in a reformer reactor in the presence of a reforming catalyst to obtain a product stream and a spent catalyst;
b. regeneration of the spent catalyst in a regenerator to obtain a regenerated catalyst.

In the APC system described in the present invention, operating parameters in the reactor section are controlled by the reactor APC and operating parameters in the regenerator section are controlled by the regenerator APC. Further, the reactor APC and the regenerator APC are linked and controlled by the master APC.

I. Process of CCR Reforming

Figure 22A:
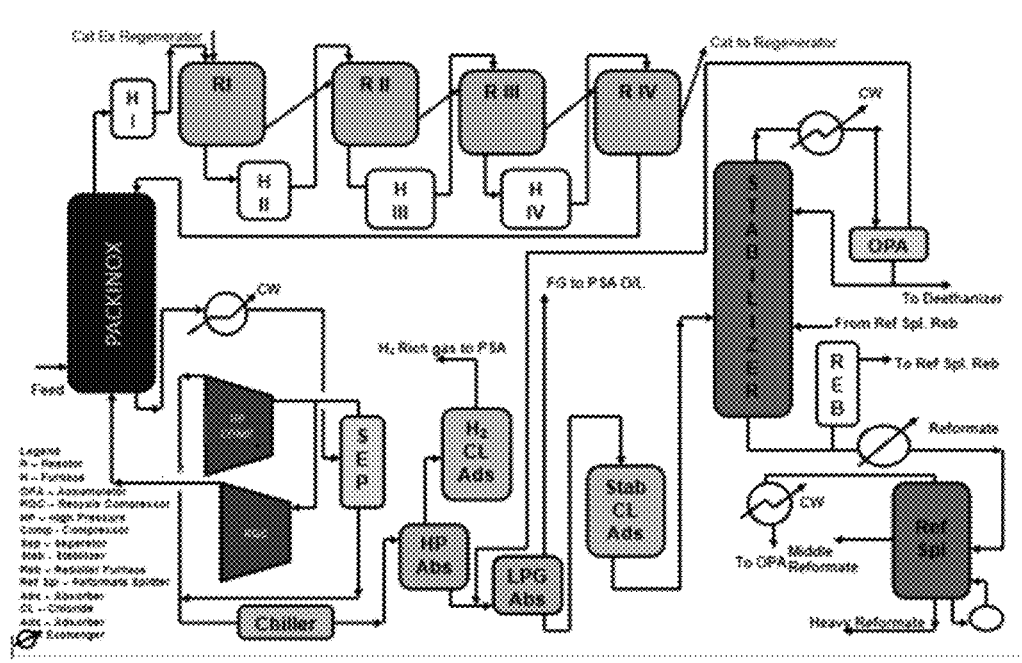
FIG. 22 illustrates the complete block diagram of the CCR reforming process

In accordance to FIG. 22 of the present invention, hydrotreated naphtha from naphtha hydro treater unit after mixing with recycle gas, preheating and final heating in the feed effluent exchanger and charge heater respectively is fed to $1^{st}$ reactor in a series of four reactors (RI to RIV) to obtain reactor effluent. As reforming reaction is predominantly endothermic, inter heaters are provided in between the reactors to maintain desired reactor inlet temperature. The CCR is designed to produce octane rich motor spirit blend component—the heavy Reformate and benzene and toluene rich middle reformate. The reactor effluent after exchanging heat in the feed effluent exchanger is cooled in the trim condenser and sent to a separator. A desired quantity of gas is then recycled to the reactor section using a recycle gas compressor and the net gas is sent to the re-contacting section. A cryogenic recovery system is used to maximize hydrogen and liquefied petroleum gas (LPG) production while a Pressure Swing Adsorber (PSA) unit is used to recover hydrogen from the net gas. Stabilizer overhead liquid is stabilized in a Debutanizer and is then routed to LPG storage bullets. Stabilized reformate is split in a reformate splitter to get desired middle (benzene and toluene rich cut) and heavy (motor spirit blend component) reformate along with a paraffin rich light reformate stream which can be routed to naphtha or motor spirit pool. The reaction section APC controls the process parameters across the four reactors, intermediate fired heaters (H! to HIV), separator (SEP), recycle gas compressor (RGC), net gas (HP) compressors etc. shown in FIG. 22a.

Figure 22B:
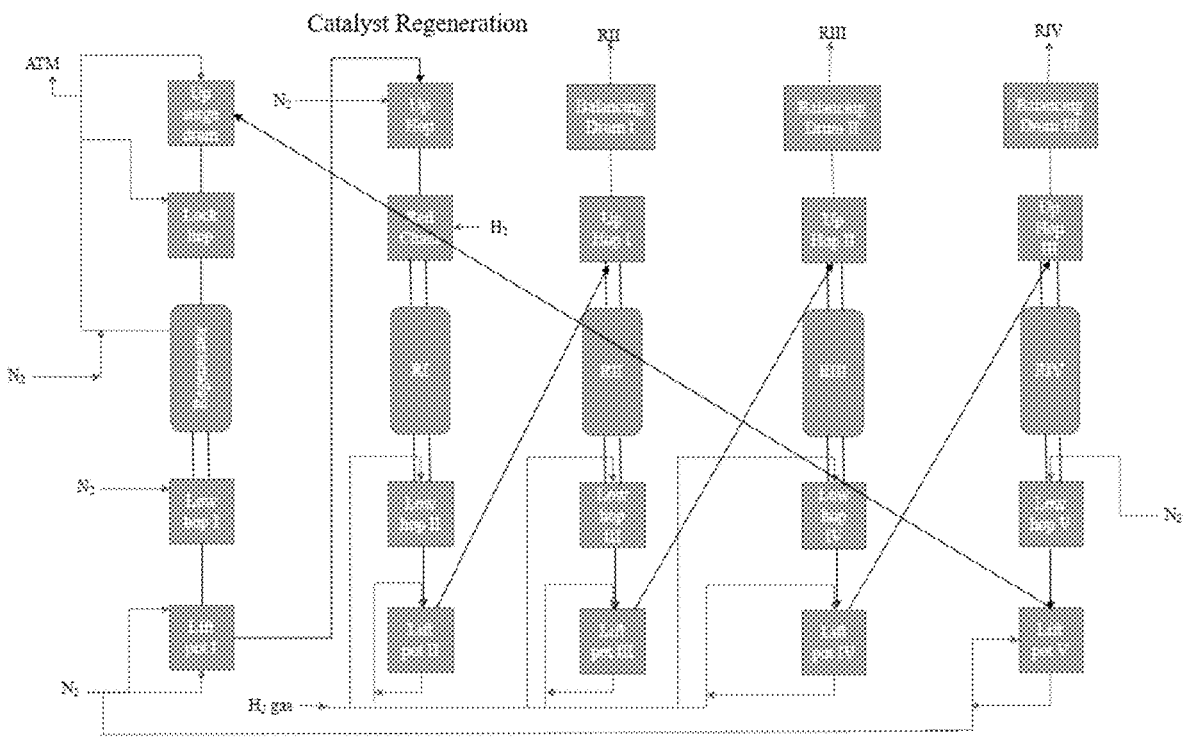

CCR Regeneration section provides a continuous stream of clean, coke-free active catalyst that is recycled back to the reactors. Continuous circulation of regenerated catalyst helps to maintain optimum catalyst performance at high severity for long on stream periods. The regeneration section APC controls the process parameters in the regeneration circuit comprising of the regenerator, lower hoppers (low hop), lift pots, upper hoppers (up hop), reactors (RI to RIV), reduction chamber (red cham) etc. as shown in FIG. 22b.

II. Master-Slave Configuration

A typical APC works on the concept of controlled variables, manipulative variable, and disturbance variables. The control variable means variable that need to be controlled, the manipulative variable means variable that can be manipulated to control the process, and the distributed variable means the variable that cannot be controlled, like the ambient temperature etc. but affects the process plant.

Figure 2:
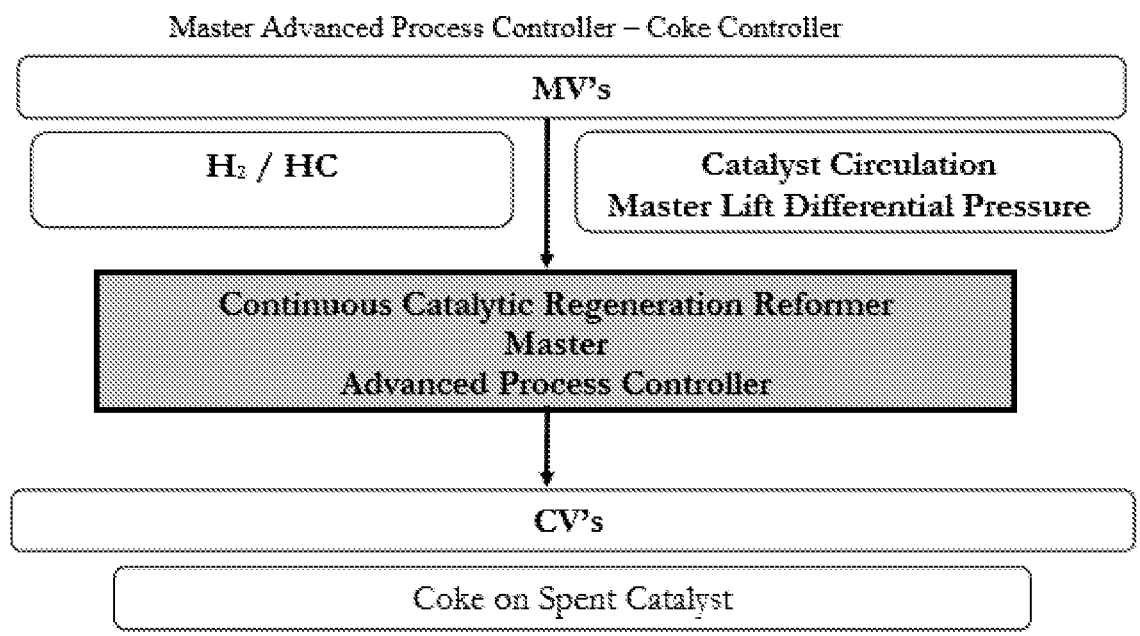
FIG. 2 illustrates the reformer master advanced process controller design

In an embodiment of the present invention, the slave element of the M-S configuration comprises of the reactor APC and the regeneration APC. The slave element of the present invention is also called slave APC or slave controller and the terms are used interchangeably throughout the description. Further, the master APC is also called as master controller and is used interchangeably throughout the disclosure. In another embodiment, the master APC is also called as coke controller, as shown in FIG. 2 of the present invention and is used interchangeably throughout the disclosure. The reactor APC is also called as reactor controller, the regeneration APC is also called as regeneration controller, and the master APC is also called master controller and the terms are used interchangeably throughout the description.

In another embodiment of the present invention, the slave elements i.e. the reactor controller and the regenerator controller are full-fledged APCs having their own controlled variables to control and alter their parameters based on their own controlled variables. In yet another embodiment of the present invention, the slave controller is also a master controller of the reactor section. In still another embodiment of the present invention, the slave controller is also a master controller of the regeneration section.

Figure 1:
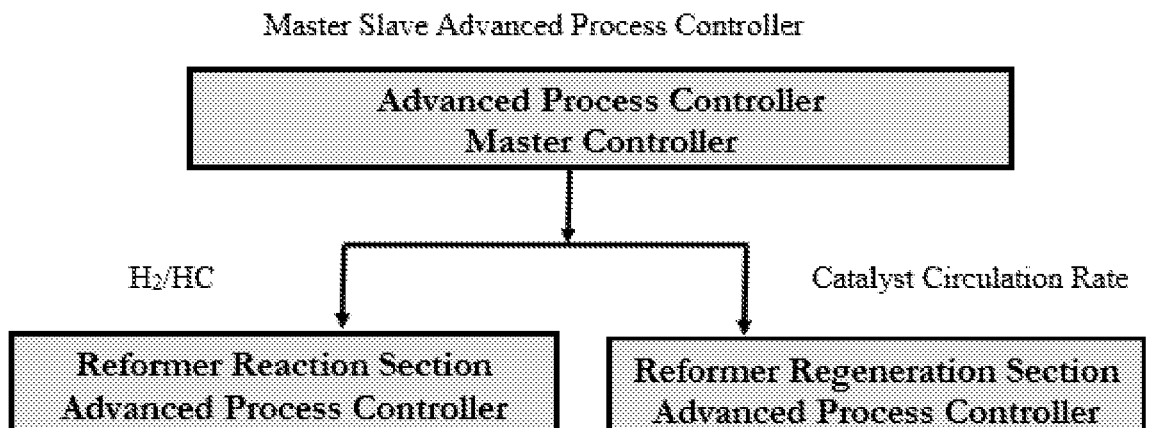
FIG. 1 illustrates the concept of reformer master-slave advanced process controller

FIG. 1 shows the M-S configuration of the present invention, wherein the master controller is linked to both the reactor controller and the regenerator controller.

In a generic CCR reforming process, the reforming is optimum at a certain coke on the spent catalyst. With the ever-changing composition of reformer feed, considering change in the crude being processed in the refinery every second day, the APCs vary the reformer operating severity, the Hydrogen/Hydrocarbon ratio ($H_2$/HC) etc. to keep the reforming plant operation optimized. These changes impact the coke on the catalyst at the outlet of the last reactor i.e. on the spent catalyst.

In an embodiment of the present invention, the master APC of the present invention maintains an optimum coke on spent catalyst by manipulating the $H_2$/HC ratio and the catalyst circulation rate and further achieves the same through M-S configuration. In another embodiment, the coke controller, gives a set point to the slave APC in the reaction section and the regeneration section. More particularly, the set point of the $H_2$/HC ratio is passed on from the master controller to the reactor controller; while the set point of the catalyst circulation is passed on from the master controller to the regenerator controller. In yet another embodiment, the $H_2$/HC ratio and catalyst circulation ratio are manipulated variables and coke on the spent catalyst is controlled variable in the M-S configuration, as shown in FIG. 2 of the present invention.

In an embodiment of the present invention, the master controller is executed every 10 minutes unlike a typical APC which is executed every minute. This ensures that the slave APC have had enough time to implement the desired change. In another embodiment, the slave APCs are executed every minute. In other words, the M-S configuration enables the master controller to execute every 10 minutes and enables the reactor controller and the regeneration controller to execute every minute.

Figure 3:
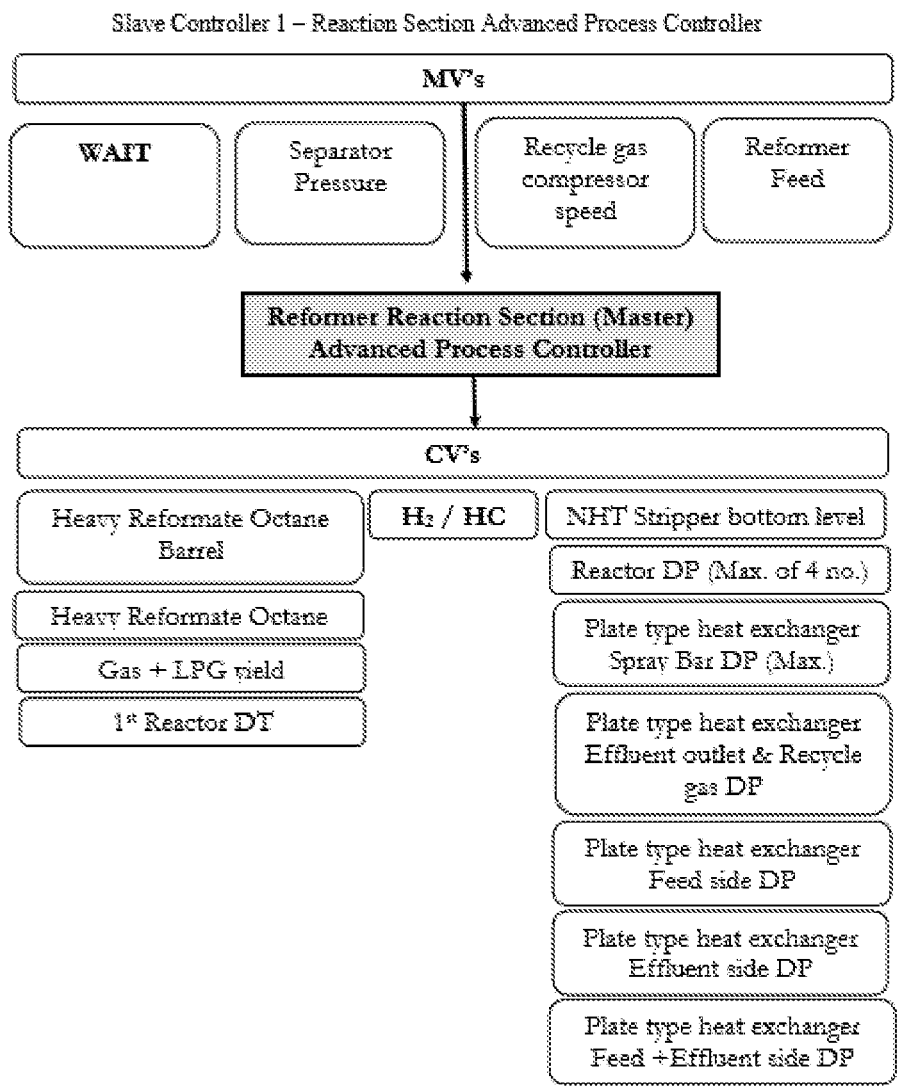
FIG. 3 illustrates the reformer reaction section (slave 1) advanced process controller design
Figure 5:
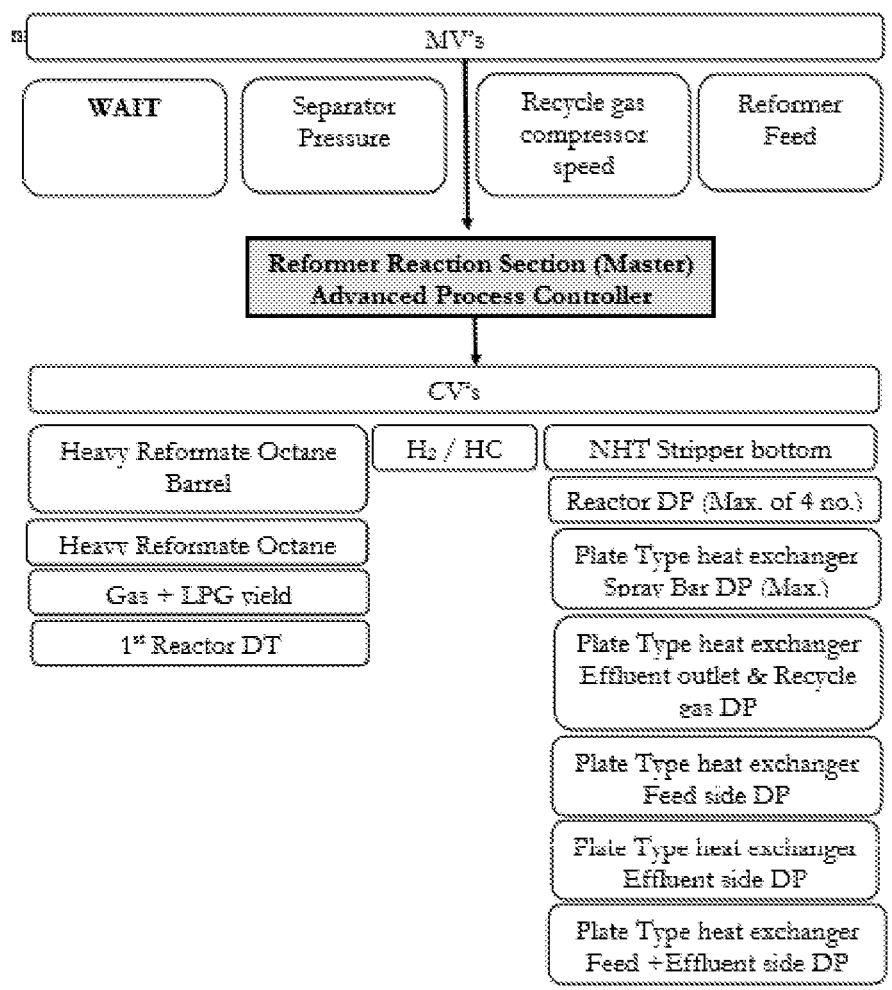
FIG. 5 illustrates the reformer reaction section (master) advanced process controller design

As shown in the FIG. 3 and FIG. 5 of the present invention, the reactor controller acts as a master controller, further called as reaction section master controller or reaction master controller and has another slave controller, further called as reaction section slave controller or reaction slave controller.

As reformer reaction section is inclusive of multiple reactors, in series, with intermediate fired heaters to maintain the inlet temperature of the individual reactor, generation of a single reactor inlet temperature set point would not suffice. Therefore, a M-S concept was introduced within the reaction section controller, as well. In the M-S concept in the reactor controller the reaction master controller and the reaction slave controller are linked in a way that the independent variable of the reaction master controller becomes the dependent variable of the reaction slave controller.

In an embodiment of the present invention, the reformer reaction section master controller generates a target Weighted Average Inlet Temperature (WAIT) based on its dependent (controlled) variable, heavy reformate octane barrel and the set point of the separator pressure. Therefore, in the reaction master controller 'WAIT' is an independent variable.

In another embodiment of the present invention, the master controller is linked to the reactor controller, such that the manipulated variable $H_2$/HC ratio of the master controller is connected to the reaction section slave controller. In yet another embodiment of the present invention, the reactor controller optimizes the control ratio of $H_2$/HC by reducing it in the range of 0.0 to 1.0 by manipulating the speed of the steam driven recycle gas compressor. More preferably, the control of $H_2$/HC ratio is optimized by reducing it in the range of 0.3 to 0.4.

In yet another embodiment of the present invention, the M-S configuration optimizes the catalyst circulation rate, by increasing it by 130 kg/hour. In another embodiment, the M-S configuration controls the coke on spent catalyst in the range of 3% to 6%. More preferably, the M-S configuration controls the coke on spent catalyst in the range of 4.5% to 5.5%

Figure 4:
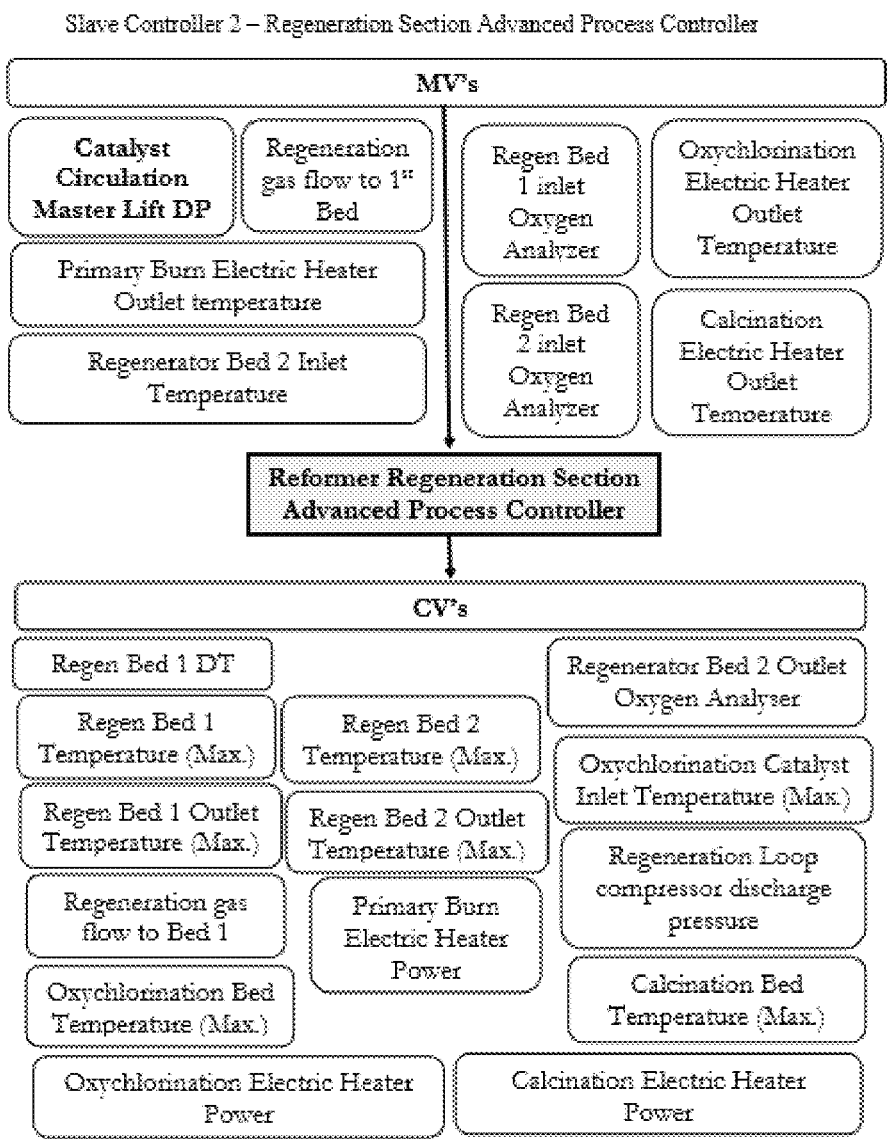
FIG. 4 illustrates the reformer regeneration section (slave 2) advanced process controller design

As shown in the FIG. 4, the master controller is linked to the regenerator controller, such that the manipulated variable catalyst circulation (i.e. Master Lift Differential Pressure (DP)) of the master controller connects the master controller to the regeneration section slave controller.

III. Online Inferential

For the master controller of the M-S configuration of the present invention, to control the coke on spent catalyst, it is imperative to first assess it. Hence, a powerful empirical tool known as inferential is implemented in order to predict the 'coke on spent catalyst'. In an embodiment, the inferential has been built using a rigorous regression tool, wherein inputs to the inferential are from both the reactor as well as the regeneration section.

It is a known fact that the effect of any reformer operating conditions are apparent on the spent catalyst carbon content only after a certain period of time. This period of time could be anywhere between 3 to 10 days as governed by the catalyst inventory in the reactor regenerator system and the actual catalyst circulation rate. Normally a time delay is factored in for such processes. In an embodiment of the present invention, the intent of the coke controller is to indicate that the coke on spent catalyst is at a certain value and the $H_2$/HC ratio and the catalyst circulation rate have to be at a specified value to control the coke on spent catalyst in the desired range. In another embodiment of the present invention, the APC system with the M-S configuration is designed without considering any time delay. In other words, the M-S configuration controls the coke on the spent catalyst, using an online inferential built without any time lag. In yet another embodiment of the present invention, the online bias updating of the spent catalyst coke inferential enables the APC system to capture change in metal dispersion, chloride on catalyst, extent of reduction, etc. which impact the complex process of coke laydown on catalyst.

In an embodiment of the present invention, an online inferential of heavy reformate octane, built using a regression model, is used to calculate heavy reformate octane barrel. The online inferential is used by the APC system, to maintain heavy reformate octane and maximize heavy reformate octane barrel. Online bias updation of the inferential enables the APC system to capture the change in reformer catalyst behavior due to factors like chloride water balance on the catalyst, platinum dispersion during catalyst rejuvenation in the regeneration section, equilibrium coke laydown on spent catalyst, catalyst aging, reduction in catalyst surface area, etc.

IV. Regeneration APC

In an embodiment of the present invention, the regeneration controller is designed to control every aspect of catalyst regeneration starting from optimization of coke burn in the first bed of the regenerator, so that a minimum coke burning is maintained in the second bed of the regenerator at any point of time. The regenerator controller maintains a higher coke burning rate in the first bed of the regenerator, in the range of 1 to 15° C. higher than before implementation of APC. More preferably, the coke burning rate in the first bed of the regenerator is maintained in the range of 5 to 10° C. higher than before the implementation of APC. A minimum coke burning rate is maintained, by the regenerator controller, in the second bed of the regenerator in the range of 1 to 15° C. More preferably, the minimum coke burning rate in the second bed of the regenerator is maintained at 10° C. The controlling of a minimum coke burning rate in the second bed of the regenerator ensures that in case of variation in catalyst coke content, no coke slips unburned into the oxychlorination zone of the regenerator, thereby avoiding black burn and incomplete rejuvenation of catalyst, which in-turn affects the rate of desirable reaction and hence the octane barrel of the heavy reformate.

As shown in FIG. 4, the regenerator controller comprises of the following as control variables:
(i) $1^{st}$ bed differential temperature (ii) max. of the $1^{st}$ bed temperature (iii) max. of the $1^{st}$ bed outlet temperature (iv) $2^{nd}$ bed differential temperature (v) max. of the $2^{nd}$ bed temperature (vi) max. of the $2^{nd}$ bed outlet temperature (vii) $2^{nd}$ bed outlet oxygen (viii) oxychlorination bed catalyst outlet temperature—max. of all the spider legs. (ix) regeneration loop gas flow (x) regeneration loop compressor discharge pressure (xi) primary burn electric heater power as the constraint variables.

In an embodiment of the present invention, the regenerator controller comprises of the following as manipulated variables (i) master catalyst lift differential pressure, which governs the catalyst circulation rate (ii) regeneration loop gas flow to primary bed (iii) primary burn inlet temperature (iv) primary bed inlet oxygen content (v) secondary bed inlet temperature (vi) secondary bed inlet oxygen content. By including all the manipulated variables within the regeneration controller, it is ensured that all the control as well as the constraint variables are controlled.

In another embodiment of the present invention, the regeneration controller controls catalyst rejuvenation. The control of the catalyst rejuvenation comprises of controlling re-dispersion of noble metal on base catalyst and regaining activity by impregnation of huge amounts of chloride in a high oxygen atmosphere at a desired temperature and catalyst reduction to remove the water generated during carbon burn.

In yet another embodiment of the present invention, the regeneration controller controls (i) oxychlorination bed max. temperature (ii) calcination bed max. temperature as controlled variables (iii) oxychlorination zone electric heater power (iv) calcination zone electric heater power as the constraint variable by manipulating (i) oxychlorination zone electric heater outlet temperature (ii) calcination zone electric heater outlet temperature as constraint variables.

Figure 16:
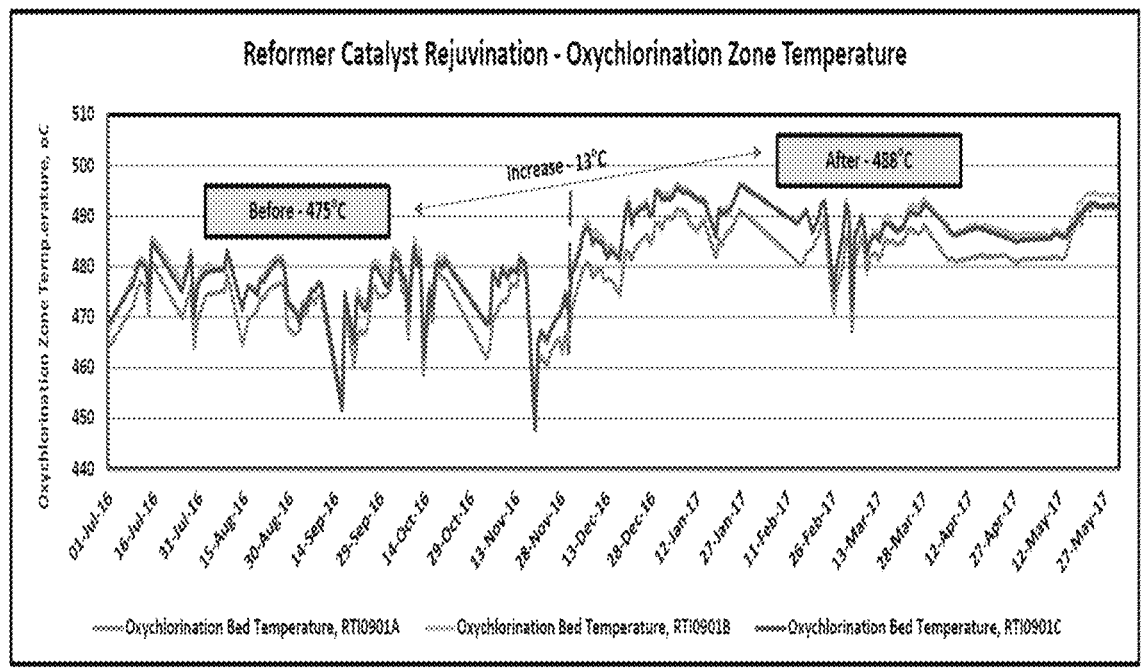
FIG. 16 illustrates the sustained operation of the regenerator oxychlorination zone at a higher temperature due to the advanced process controller operation

In another embodiment of the present invention, the regeneration controller controls the oxychlorination zone temperature at 10 to 15° C. higher than before implementation of the—APC. More preferably, oxychlorination zone temperature is controlled at 13 to 14° C. higher than before implementation of APC, as illustrated in FIG. 16 of the present invention. The FIG. 16 shows that the oxychlorination zone temperature was controlled at 475° C. before implementation of APC and 488° C. after implementation of APC.

Figure 17:
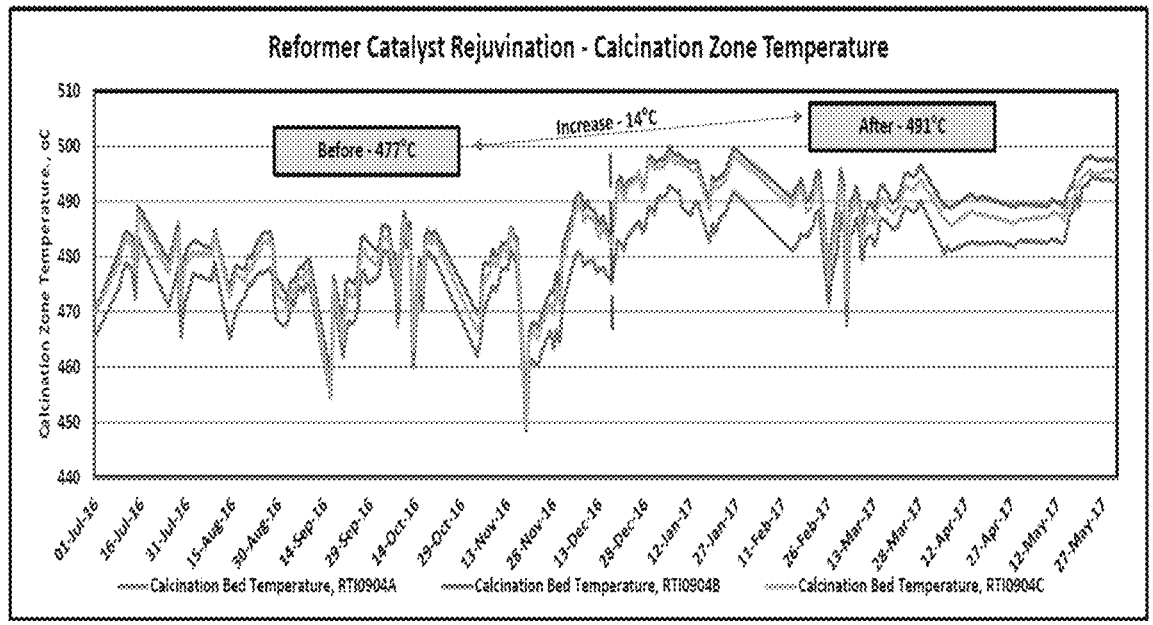
FIG. 17 illustrates the operation of the regenerator calcination zone at a higher temperature due to the advanced process controller operation FIG. 18 illustrated the sustained operation of the reduction chamber at the desired temperature due to the advanced process controller operation

In yet another embodiment of the present invention, the regeneration controller controls the calcination zone temperature at 10 to 20° C. higher than before implementation of APC. More preferably, calcination zone temperature is controlled at 13 to 14° C. higher than before implementation of APC, as illustrated in FIG. 17 of the present invention. The FIG. 17 shows that the calcination zone temperature was controlled at 477° C. before implementation of APC and 491° C. after implementation of APC.

In still another embodiment of the present invention, the regeneration controller controls the catalyst reduction temperature at 5° C. higher than before implementation of the APC. The FIG. 18 of the present invention shows that the catalyst reduction temperature is controlled at a desired limit of 480° C.

Figure 19:
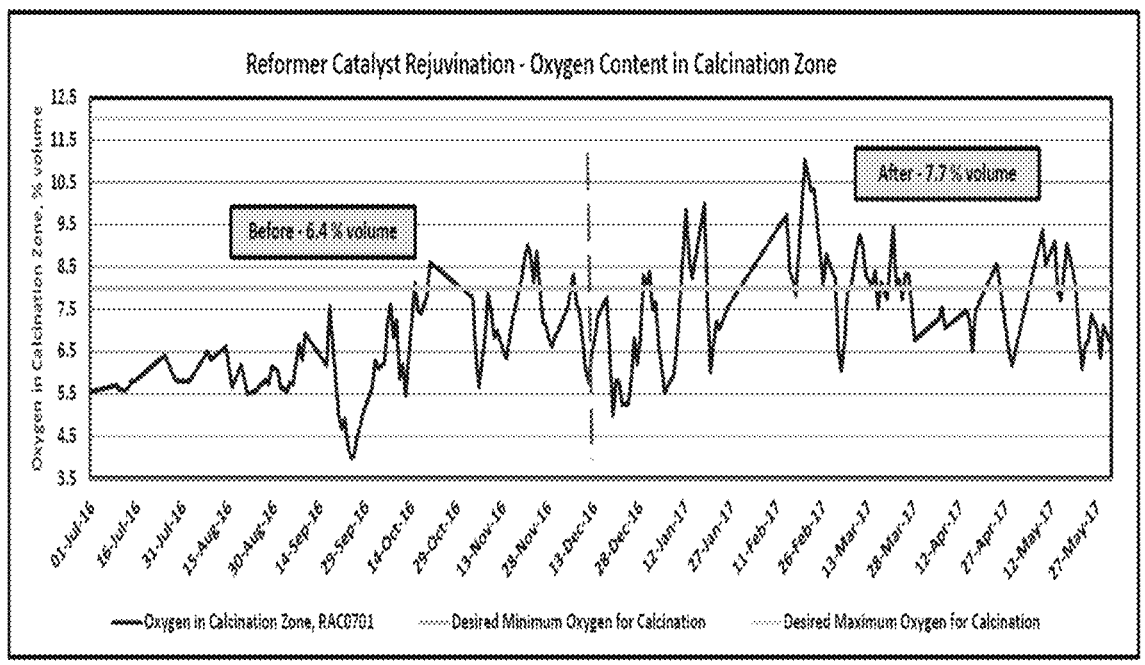
FIG. 19 illustrates the sustained operation of the regenerator calcination zone at a higher oxygen content due to the advanced process controller operation

In another embodiment of the present invention, the regenerator controller ensures that the oxygen content in the calcination zone of the regenerator is closer to the desired limit of 8% volume. As shown in the FIG. 19 of the present invention, oxygen content in the calcination zone of the regenerator is controlled at least 1.0% to 1.5% volume higher than without implementation of APC.

The control of the oxychlorination, the calcination, and the reduction zone temperatures and oxygen in the calcination zone closer to their desired limit improves the rejuvenation of catalyst i.e. ensures proper re-dispersion of noble metal, platinum, on the base catalyst, impregnation of adequate amount of chloride in a high oxygen atmosphere, all of which in-turn increases heavy reformate octane barrel.

Figure 21:
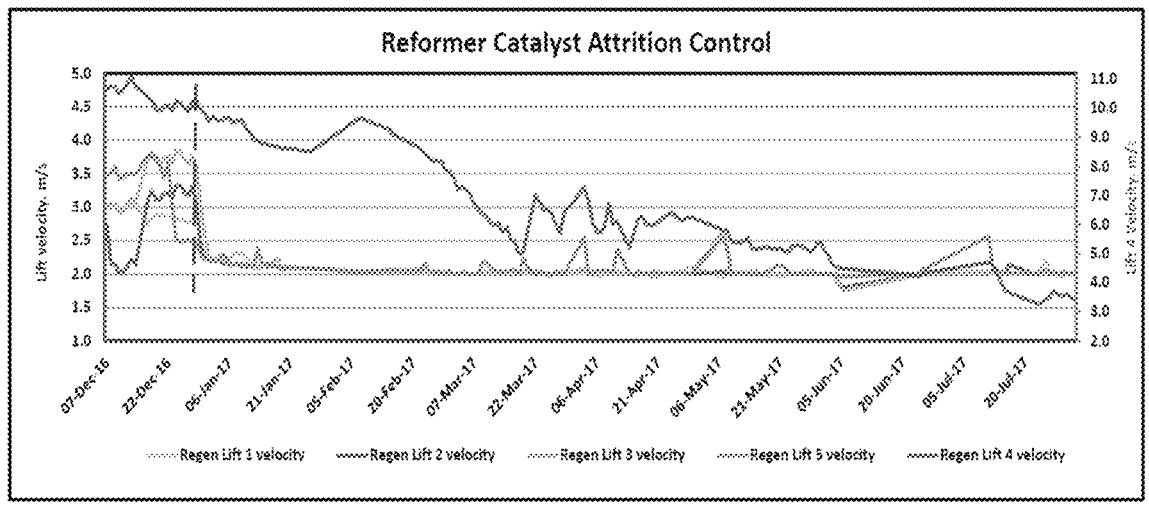
FIG. 21 illustrates the sustained operation of reformer at much lower lift velocities due to the advanced process controller operation

In an embodiment of the present invention, the regenerator controller controls the catalyst lift velocity in the range of 2.0 to 3.0 meters per second (m/s). More preferably, the catalyst lift velocities are reduced from around 3.0-3.5 m/s to the desired range of 2.0 m/s and maintain it consistently at that level. As shown in FIG. 21 of the present invention, the catalyst lift velocity of one of the lift, lift 4 has been reduced from more than 10.0 m/s to 3.0 m/s. The average catalyst make-up rate, in the CCR reformer, in the year 2016 was 248 kilograms per month before implementation of the APC and post the implementation of the APC in the regeneration section, the average catalyst make-up rate has been reduced to 231 kilograms per month. Therefore, this amounts to 17 kilogram per month reduction in the consumption of the reformer catalyst, accruing a benefit of ₹ 0.22 crores per annum (US$32,205 per annum). This reduction in the catalyst lift velocities did not only reduce catalyst attrition and thereby catalyst consumption but would also avoid any buildup of pressure drop across the reactors.

In another embodiment of the present invention, the regenerator controller manipulates the outlet temperature of the electric heaters in the range of 5 to 10° C. in the primary burn heater; 10 to 15° C. in the reduction heater; 30 to 35° C. in the oxychlorination zone heater; and 30 to 35° C. in the calcination zone heater. In yet another embodiment of the present invention, regenerator controller manipulates the regeneration loop gas flow in the range of 1000 to 4000 kg/hour.

V. Reformer Controller

As shown in FIG. 5 of the present invention, the control/constraint variables of the reaction master controller comprise of heavy reformate octane barrel, heavy reformate octane, liquefied petroleum gas (LPG) and gas yield, $1^{st}$ reactor differential temperature, $H_2$/HC ratio, reactor differential pressures (DP), NHT stripper bottom level, Plate Type heat exchanger Spray Bar DP, Plate Type heat exchanger Effluent outlet & Recycle gas DP, Plate Type heat exchanger Feed side DP, Plate Type heat exchanger Effluent side DP, and Plate Type heat exchanger Feed and Effluent side DP. The manipulated variables of the reaction section master controller comprise of WAIT, separator pressure, recycle gas compressor speed, and reformer feed.

Figure 6:
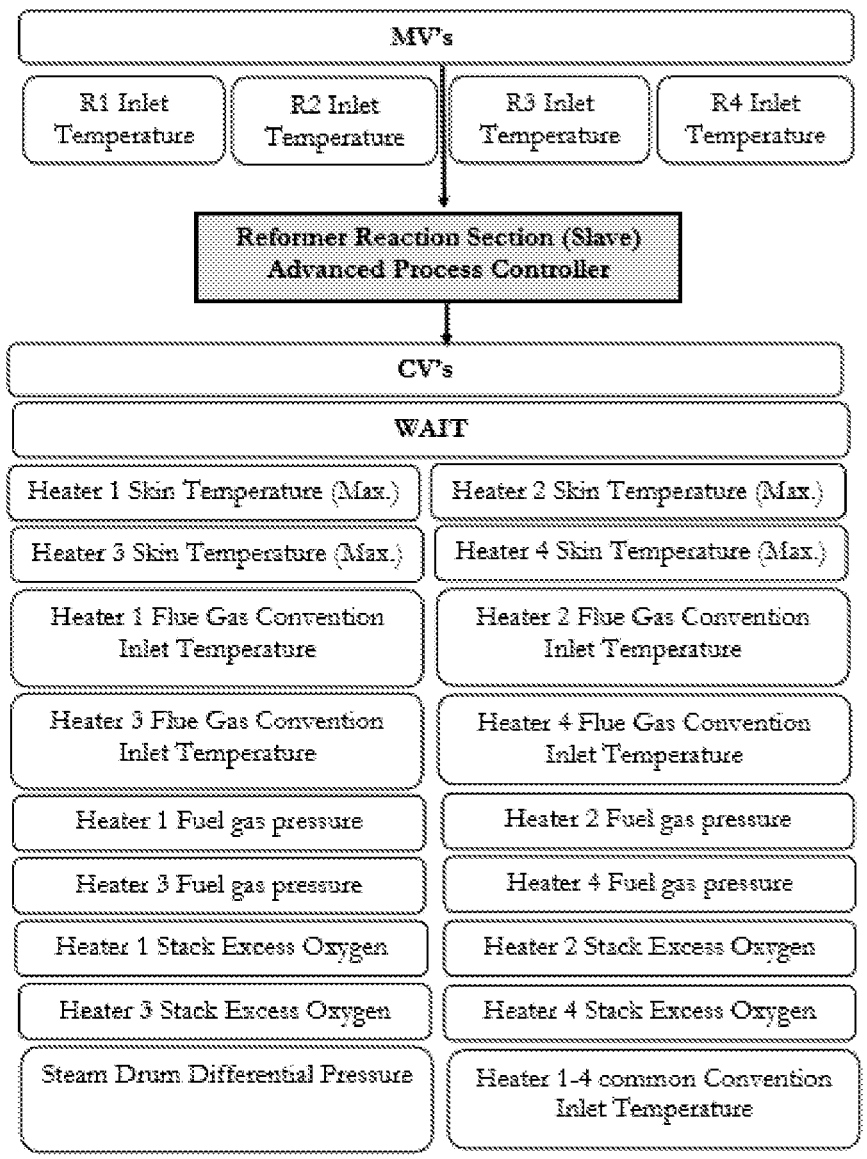
FIG. 6 illustrates the reformer reaction section (slave) advanced process controller design

As shown in FIG. 6 of the present invention, the manipulated variables of the reaction slave controller comprise of inlet temperatures of reactor 1 to 4. The controlled/constraint variables of the reaction slave controller comprise of WAIT, skin temperature of heater 1 to 4, flue gas convention inlet temperature of heater 1 to 4, fuel gas pressure of heater 1 to 4, stack excess oxygen of heater 1 to 4, common flue gas convention inlet temperature of heater 1 to 4, and steam drum differential pressure.

The main product of CCR reformer is heavy reformate. Traditionally reformer operation is altered, once the octane analysis of heavy reformate is available which is typically once or twice in a twenty-four-hour period. Moreover, the action in the unit is unilaterally on reaction section operating severity, without acknowledging the impact on heavy reformate octane barrel. In an embodiment of the present invention, the reaction controller of the present invention maximizes octane barrel of heavy reformate instead of only octane. As heavy reformate is a blend component of the refinery gasoline pool, the reaction controller operation translates into increase in production of gasoline from the refinery.

In an embodiment of the present invention, heavy reformate the octane barrel is calculated using an online inferential, an analytical tool, built in-house using regression. In another embodiment of the present invention, the heavy reformate octane barrel would be maximized, by the reaction controller, by manipulating reformer severity i.e. reactor inlet temperature and separator pressure.

In another embodiment of the present invention, the reformer reaction section master controller generates a target WAIT based on its dependent (controlled) variable, heavy reformate octane barrel and the set point of the separator pressure. Therefore, in the reaction master controller 'WAIT' is an independent variable.

Figure 7:
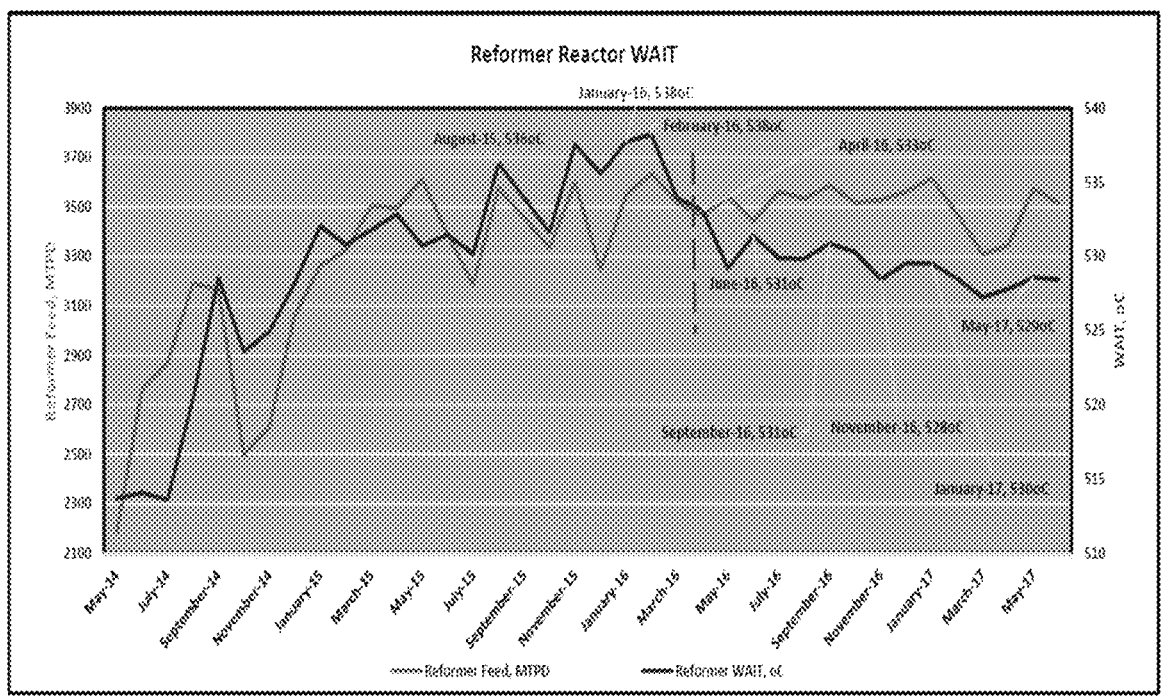
FIG. 7 illustrates the sustained operation of reformer at a lower reactor weighted average inlet temperature due to the advanced process controller operation
Figure 8:
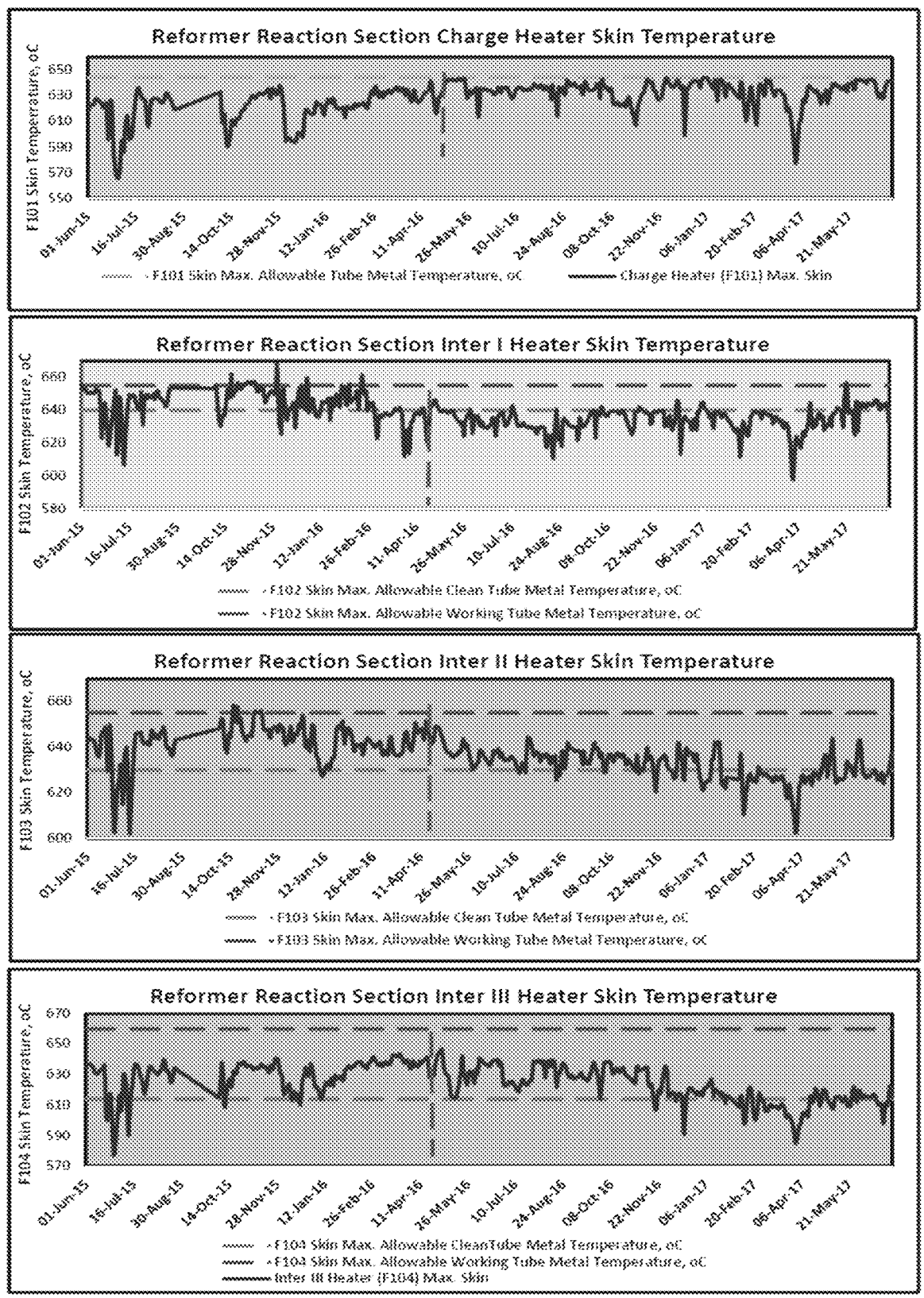
FIG. 8 illustrates the sustained optimization in reformer fired heaters operation with respect to the tube skin temperature due to the advanced process controller operation

In an embodiment of the present invention, the reactor controller varies the WAIT in the range of 8 to 10° C. FIG. 7 of the present invention shows that the WAIT before implementation of APC was in the range of 536 to 538° C. and the same after implementation of APC was in the range of 531 to 529° C. The WAIT in-turn maintains heavy reformate octane in the range of 105-106 and is consistently maintaining a 1% to 2% higher heavy reformate yield.

Figure 9:
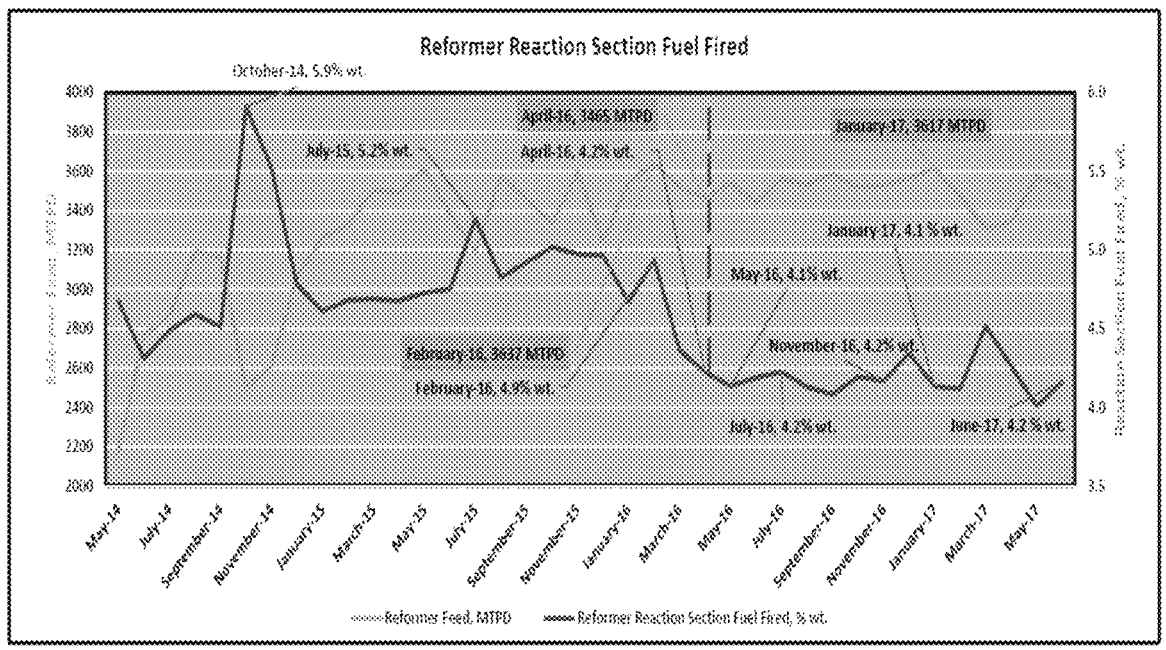
FIG. 9 illustrates the sustained operation of the reformer reaction section fired heater at a lower fuel fired due the advanced process controller operation

Based on the translated value of the 'WAIT', the reaction slave controller generates set-points for the four fired heaters outlet temperature to manipulate the fired heater fuel gas firing thereby controlling the WAIT. The FIG. 9 of the present invention also illustrates that the fuel fired before implementation of APC was higher, approximately 161.3 MTPD (metric tonnes per day) and after implementation of the APC was lower. 147.0 MTPD. In an embodiment of the present invention, the reactor controller consistently operates the unit at a lower fuel fired, at about 0.7% wt. on feed lower after implementation of APC than before implementation of APC. Further, the fired heater outlet temperature being cascaded with fuel gas pressure, in the DCS level, controls the fired heater operation.

In another embodiment, the reaction slave controller manipulates the inlet temperature of the four reactors in series, considering fired heater constraints (eighteen number in all, for the four fired heaters) like tube skin temperature, flue gas convention inlet temperature, fuel gas pressure, excess oxygen and steam drum pressure. Further, reaction master controller maximizes reformer feed and optimizes $H_2$/HC for which it gets a set point from the master controller.

Figure 10:
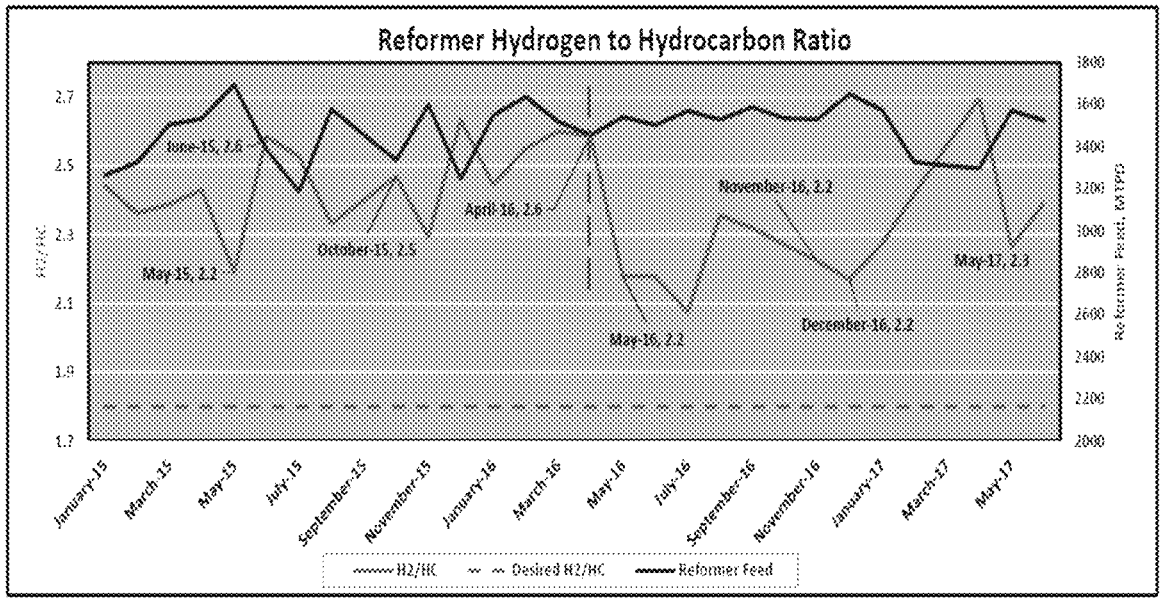
FIG. 10 illustrates the sustained operation of the reformer at a lower hydrogen to hydrocarbon ratio due to the advanced process controller operation
Figure 11:
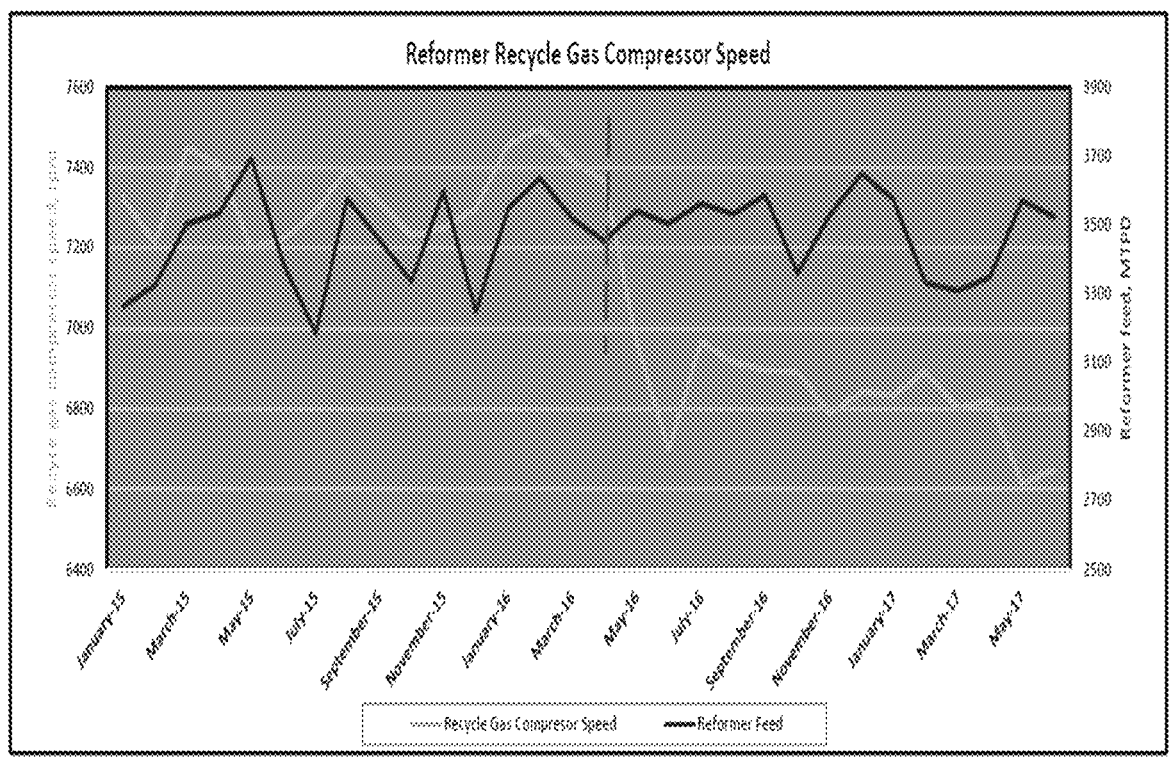
FIG. 11 illustrates the sustained operation of the reformer recycle gas compressor at a lower speed due to the advanced process controller operation
Figure 12:
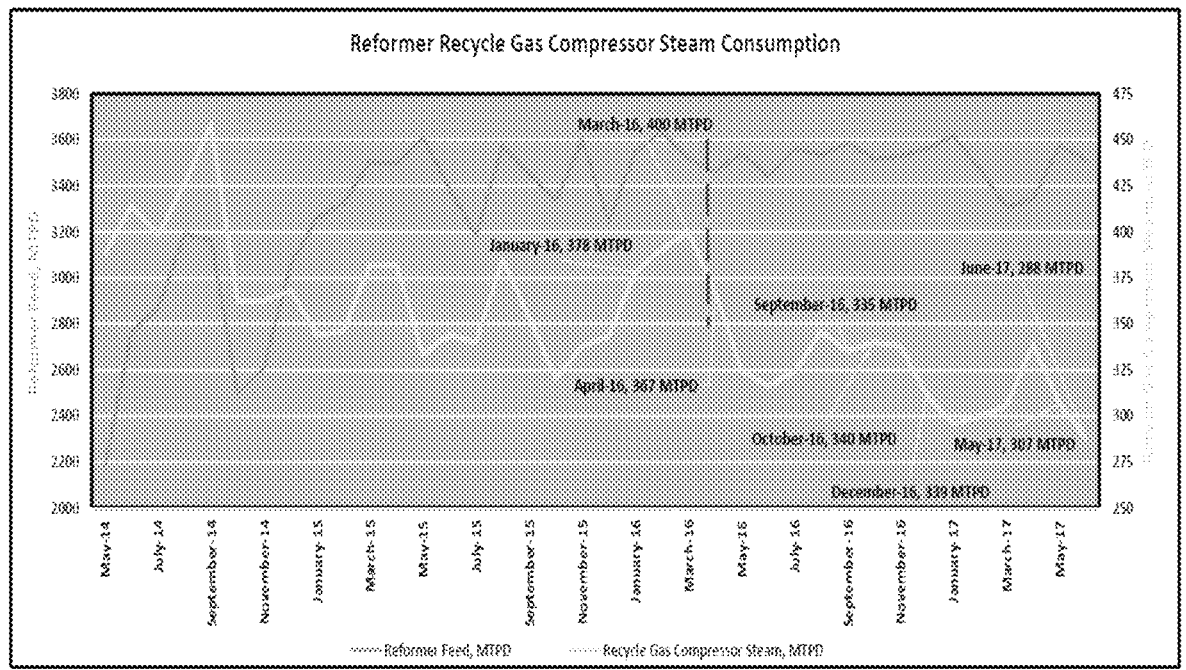
FIG. 12 illustrates the sustained operation of the reformer recycle gas compressor at a lower steam consumption due to the advanced process controller operation

In yet another embodiment of the present invention, the reactor controller optimizes the—ratio of $H_2$/HC by reducing it in the range of 0 to 1 by manipulating the speed of the steam driven recycle gas compressor as shown in FIG. 11 of the present invention. More preferably, the $H_2$/HC ratio is optimized in the range of 0.3 to 0.4. As illustrated in FIG. 10 of the present invention, the reactor controller optimizes unit operation from 2.6 to 2.2 by taking it closer to desired (1.8) $H_2$/HC ratio. Further, FIG. 12 of the present invention shows that decrease in the $H_2$/HC ratio reduces energy consumption and provides a lee-way for reformer feed maximization. In still another embodiment of the present invention, the reactor controller consistently operates at a lower steam consumption by about 65 MTPD.

In another embodiment of the present invention, the reactor controller consistently maintains heavy reformate yield at 1% to 2% higher than before implementation of APC. In another embodiment of the present invention, the reactor controller controls production of hydrogen product at a 3%-5% higher rate than before implementation of APC. In yet another embodiment of the present invention, the reactor controller controls a higher heavy reformate and hydrogen yield even with 10% to 15% variation in feed naphthenes and aromatics content. In still another embodiment of the present invention, the controller controls methane content in the hydrogen product at the outlet of the PSA unit.

VI. Reverse Action

A reformer feed is characterized by its naphthenes (N) and aromatics (A) content i.e. N+A. In case the feed becomes leaner, i.e. N+A reduces and therefore the heavy reformate octane reduces. The reaction controller in such a scenario would logically increase the operating severity i.e. WAIT. Therefore, to avoid increase in WAIT, the APC system of the present invention has the gas and the LPG yield as a constraint variable.

Further, in case of sulphur poisoning of reformer catalyst, the heavy reformate octane would reduce and APC would increase operating severity i.e. WAIT, thus causing undesirable reverse action. In an embodiment of the present invention, the $1^{st}$ Reactor Differential Temperature (DT) is implemented in the APC system to ensure that the APC does not take the reverse action.

VII. Reformer Compressors within APCs

In an embodiment of the present invention, the design features of compressors are incorporated and utilized in the reactor control strategy. The recycle gas compressor is a steam driven centrifugal compressor while the net gas compressor is a 10 MW, three stage reciprocating compressor provided with a step less control. Normally load of the net gas compressor is manually increased or decreased based on change in feed quality, reactor operating severity etc. resulting in change in separator pressure. The recycle gas compressor load is also adjusted manually. Further, in order to control the ratio of $H_2$/HC, the speed of the steam driven recycle gas compressor is manipulated by the APC. In yet another embodiment of the present invention, with the APC designed to change the reformer reactor operating severity and load of the steam driven recycle gas compressor, the flow to the net gas compressor varies. The step less control of the net gas compressor, operating in auto, ensures control of the separator pressure.

VIII. Other APCs

In an embodiment of the present invention, the APC controllers comprising of coke, regeneration and reaction section, have also been implemented for control of (i) catalyst lift velocities (ii) recycle gas moisture (iii) optimization of refrigeration outlet temperature for improved recovery of hydrogen and LPG (iv) methane content in hydrogen product at the outlet of the Pressure Swing Adsorption (PSA) unit to maximize hydrogen production (v) catalyst chloride control (vi) corrosion control in regeneration washing drum loop.

IX. Distributed Control System (DCS) Interlock

The regeneration loop gas compressor is a reciprocating compressor with a flow control in its discharge. The flow control governs the operation of the regeneration loop compressor as long as its discharge pressure is controlled. If the pressure increases above a certain specified value, the pressure becomes governing i.e. the pressure controls the operation of the compressor.

In an embodiment of the present invention, as the regeneration loop gas flow is being manipulated by the APC system, the APC has an intelligence to detect this change in operation in the DCS. In another embodiment of the present invention, if the pressure becomes governing in the DCS, the manipulated variable is dropped out of the APC raising an alarm to draw panel person's attention to the change in mode of operation from supervisory to supervisor.

X. Interlocks in the APC System

In case of upset in the refrigeration section of reformer, the heaviers in the feed to the pressure swing adsorption (PSA) section will increase. Due to this increase of heaviers in PSA feed, the methane content in product hydrogen will decrease. In order to control methane, the APC will logically increase the operation factor. Therefore, in order to avoid this reverse action, an interlock has been created. An inferential has been built for the $C_4$+ content of PSA feed. Above a certain value of $C_4$+ in PSA feed, the PSA section APC would trip on this interlock.

In an embodiment of the present invention, the interlocks have been created so that in case of tripping of an equipment, the associated APC would trip, and an alarm will be generated to draw the attention of the panel person to the fact that the plant is out of supervisory control. In another embodiment of the present invention, a) in case of trip of reformer feed shut down valve or reformer recycle gas compressor or any one of the four fired heater, all the reformer APC will trip, b) in case of trip of the net gas compressor, refrigeration and PSA APC would trip and (c) in case of trip of shutdown valve associated with in the regeneration section, the regeneration controllers would trip.

In another embodiment, an interlock is incorporated, which drops the two oxygen analyzers, at primary and secondary bed inlet, out of the regenerator controller in case the oxygen content in the calcination zone falls below the desired level.

In yet another embodiment of the present invention, as carbon burn is prone to a runaway reaction, the interlocks have been created within the APC, when some critical parameters like (a) oxychlorination zone catalyst inlet temperature (b) oxychlorination bed max. temperature (c) calcination bed max. temperature are a certain value higher than the upper limit of the controlled variable, the regeneration controller trips. In still another embodiment of the present invention, the regeneration controller also trips in case of (a) shutdown valve associated with the master lift trips (b) regeneration goes from white burn to black burn.

In still another embodiment of the present invention, the interlocks drop a particular manipulated variable from the APC in case of trip of its associated equipment/instrumentation like (a) burning bed inlet electric heater (b) oxychlorination bed inlet electric heater (c) calcination bed inlet electric heater (d) reduction chamber inlet electric heater (e) master lift shut down valve (f) lift 2 shutdown valve (g) lift 3 shutdown valve (h) lift 4 shutdown valve (i) lift 5 shutdown valve. This is to sensitize the APC so as to not take any action as the associated equipment/instrument is not available for control.

In another embodiment of the present invention, the interlocks have been created to drop the two oxygen analyzer (MV's)—primary and secondary inlet—out of the APC in case (a) the air flow rate to the regenerator calcination zone is higher than a specified value (b) calcination zone oxygen analyzer is lower than a certain specified value (c) ratio of air flows to the secondary and primary bed is lower than a certain specified value, an indicator for erroneous oxygen analyzer(s). This would not only ensure that the APC does not try to control the process based on faulty analyzers but the panel person is alerted to get the analyzers re-calibrated/corrected.

The details of the entire APC system—Controlled Variable, Manipulated Variable and Disturbance Variable are tabulated in Table 1-6 below. (C. No. stands for Controller No.)

TABLE 1

| C. No. | Controller Variable (CV) | Manipulated Variable (MV) | Remarks |
|---|---|---|---|
| 1. | Reformer Master Controller-Coke Controller | | |
| | Coke on spent catalyst-online inferential | Regeneration Section Master lift Differential Pressure Controller | MV set point sent to the slave-regeneration section controller |
| | | Reaction Section $H_2$/HC ratio | MV set point sent to the slave-reactor section controller CV |
| | Disturbance Variables (1) Reformer Feed Flow (2) WAIT (3) CCR Feed Paraffin Content (based on online inferential) | | |
| 2. | Reformer Reaction Section Controller | | |
| | $H_2$/HC ratio | Recycle Gas Speed | Set point to CV from Reformer Master Controller CV-coke on spent catalyst |
| 2. | Reformer Reaction Section Master Controller-Octane Barrel Controller | | |
| | Heavy Reformate Octane Barrel | Reformer Weighted Average Inlet Temperature (WAIT) | Maximize CV |
| | Heavy Reformate Octane Gas & LPG yield $1^{st}$ Reactor Differential Temperature | Reformer Separator Pressure | |

TABLE 2

| C. No. | Controller Variable (CV) | Manipulated Variable (MV) | Remarks |
|---|---|---|---|
| 2. | Reformer Reaction Section Feed Controller | | |
| | Naphtha Hydro Treater Stripper level control valve output Max Differential Pressure of Reformer Reactors Plate type heat exchanger Spray Bar DP (Max.) Plate type heat exchanger Effluent & recycle gas Differential Pressure Plate type heat exchanger feed side Differential Pressure Plate type heat exchanger effluent side Differential Pressure Plate type heat exchanger feed + Effluent side Differential Pressure | Reformer Feed | Maximize MV |

TABLE 3

| C. No. | Controller Variable (CV) | Manipulated Variable (MV) | Remarks |
|---|---|---|---|
| 3. | Reformer Regeneration Controller | | |
| | Regenerator Bed 1 Differential Temperature | Regeneration Section Master lift Differential Pressure Controller | Set point to MV from Reformer Master Controller CV-coke on spent catalyst |
| | Regenerator Bed 1 Max. Temperature | Regenerator Loop gas flow | |
| | Regenerator Bed 1 Max. Outlet Temperature | Regenerator Primary burn electric heater outlet temperature | |
| | Regeneration Loop gas flow downstream of exchanger | Regenerator Bed 1 inlet oxygen analyzer | |
| | Regeneration Loop gas compressor discharge pressure | Regenerator Bed 2 inlet temperature | |
| | Primary burn electric heater power | Regenerator Bed 2 Outlet Oxygen analyzer | |
| | Regenerator Bed 2 Differential Temperature | | |
| | Regenerator Bed 2 Max. Temperature | | |
| | Regenerator Bed 2 Max. Outlet Temperature | | |
| | Regenerator Bed 2 Outlet Oxygen analyzer | | |
| | Oxychlorination bed catalyst max. temperature | | |
| 3. | Reformer Catalyst Rejuvenation Controller | | |
| | Oxychlorination bed max. temperature | Oxychlorination electric heater outlet temperature | |
| | Calcination bed max. temperature | Calcination electric heater outlet temperature | |
| | Oxychlorination electric heater power Calcination electric heater power | | |

TABLE 4

| C. No. | Controller Variable (CV) | Manipulated Variable (MV) | Remarks |
|---|---|---|---|
| 4. | Reformer Regeneration Lift Velocity & Reduction Controller | | |
| | Catalyst Lift 1 velocity | Lift Gas 1 Nitrogen Flow | |
| | Catalyst Lift 2 velocity | Lift Gas 2 Hydrogen Flow | |
| | Catalyst Lift 3 velocity | Lift Gas 3 Hydrogen Flow | |
| | Catalyst Lift 4 velocity | Lift Gas 4 Hydrogen Flow | |
| | Catalyst Lift 5 velocity | Lift Gas 5 Nitrogen Flow | |
| | Hydrogen Lift gas temperature | Reduction Heater Outlet Temperature | |
| | Reduction chamber Temperature | $H_2$ from reduction chamber to $H_2$ lift gas temperature | |
| | Reduction Electric Heater Power | | |
| 4. | Reformer Recycle Gas Moisture Controller | | |
| | Recycle Gas Moisture Online Analyzer | $H_2$ rich gas from reduction chamber to reaction section separator (pressure control valve) | |
| | Reduction Chamber Pressure | | |
| 5. | Reformer Catalyst Water Chloride Balance Controller | | |
| | Regenerated Catalyst Chloride Conten-online inferential | Chloriding agent injection | |
| | Chloride as a ratio of catalyst circulation Chloride to Water Ratio | Water Injection | |

TABLE 4-continued

| C. No. | Controller Variable (CV) | Manipulated Variable (MV) | Remarks |
|---|---|---|---|
| 6. | Reformer Regeneration Corrosion Controller<br>Circulating Caustic pH<br>Circulating Caustic salt content-Online Inferential<br>Regeneration Loop Cooler Differential Pressure | Caustic Injection<br>Demineralized Water Injection | |

TABLE 5

| C. No. | Controller Variable (CV) | Manipulated Variable (MV) | Remarks |
|---|---|---|---|
| 7. | Reformer Reaction Section Reformer Weighted Average Inlet Temperature (WAIT) | Slave Controller-WAIT Controller Heater 1 outlet temperature | Set point to CV from reaction section master controller which in turn gives set point to the four MV's |
| | Heater 1 max. skin temperature<br>Heater 2 max. skin temperature<br>Heater 3 max. skin temperature<br>Heater 4 max. skin temperature<br>Heater 1 convection inlet temperature<br>Heater 2 convection inlet temperature<br>Heater 3 convection inlet temperature<br>Heater 4 convection inlet temperature<br>Heater 1 fuel gas pressure<br>Heater 2 fuel gas pressure<br>Heater 3 fuel gas pressure<br>Heater 4 fuel gas pressure | Heater 2 outlet temperature<br>Heater 3 outlet temperature<br>Heater 4 outlet temperature | |
| | Heater 1 stack excess oxygen<br>Heater 2 stack excess oxygen<br>Heater 3 stack excess oxygen<br>Heater 4 stack excess oxygen<br>Steam Drum Differential Pressure<br>Heater common convection inlet temperature | | CCR Feed is a Disturbance Variable |

TABLE 6

| C. No. | Controller Variable (CV) | Manipulated Variable (MV) | Remarks |
|---|---|---|---|
| 8 | Reformer Refrigeration Controller<br>Chiller Outlet Temperature<br>Chiller Economizer Outlet Temperature | Chiller Level<br>Economizer Level | Disturbance Variable-Ambient Temperature |
| 9. | Reformer Pressure Swing Adsorption (PSA) Controller<br>PSA outlet Hydrogen Analyzer | PSA Operation factor | Disturbance Variable-Reformer Reaction Section $H_2$ purity |

XI. Results

Increase in Hydrogen Production

Hydrogen production from reformer is affected by operating severity, chiller temperature etc. APC has been able to sustain a 5% higher hydrogen production, in spite of higher chiller temperature. The table 7-8 below shows the reformer hydrogen recovery before and after implementation of the APC.

TABLE 7

| | CCR Feed MTPD | WAIT ° C. | Chiller Outlet Temp. ° C. | PSA feed MTPD | $H_2$ MTPD | $H_2$ on PSA Feed % wt. |
|---|---|---|---|---|---|---|
| Before implementation of APC | | | | | | |
| January 2015 | 3264 | 532 | −4.1 | 160 | 74 | 46 |
| Febuary 2015 | 3325 | 531 | −4.5 | 171 | 80 | 47 |
| March 2015 | 3505 | 532 | 2.8 | 197 | 86 | 44 |
| April 2015 | 3497 | 533 | −2.9 | 196 | 99 | 50 |
| May 2015 | 3611 | 531 | −1.0 | 187 | 83 | 45 |
| June 2015 | 3388 | 531 | −2.3 | 177 | 83 | 47 |
| July 2015 | 3187 | 530 | −4.2 | 169 | 86 | 51 |
| August 2015 | 3578 | 536 | −2.4 | 196 | 94 | 48 |
| September 2015 | | | Plant outage | | | |
| October 2015 | 3336 | 532 | 0.9 | 197 | 98 | 50 |
| November 2015 | 3598 | 538 | 7.3 | 236 | 110 | 46 |
| December 2015 | 3248 | 536 | −3.5 | 196 | 98 | 50 |
| January 2016 | 3549 | 538 | 2.0 | 221 | 98 | 44 |
| Febuary 2016 | 3637 | 538 | 1.6 | 225 | 107 | 47 |
| March 2016 | 3519 | 534 | 11.4 | 232 | 103 | 44 |
| April 2016 | 3465 | 533 | 1.0 | 206 | 100 | 48 |
| Average (Before) | | | | | | 47.2 |

MTPD—Metric tonnes per day

TABLE 8

| | CCR Feed MTPD | WAIT ° C. | Chiller Outlet Temp. ° C. | PSA feed MTPD | $H_2$ MTPD | $H_2$ on PSA Feed % wt. |
|---|---|---|---|---|---|---|
| After Implementation of APC | | | | | | |
| May 2016 | 3541 | 529 | −0.6 | 200 | 105 | 52 |
| June 2016 | 3442 | 531 | 0.4 | 212 | 107 | 51 |
| July 2016 | 3563 | 530 | −0.8 | 212 | 112 | 53 |
| August 2016 | 3535 | 530 | −0.4 | 196 | 101 | 52 |
| September 2016 | 3587 | 531 | −0.7 | 199 | 101 | 51 |
| October 2016 | 3518 | 530 | −0.8 | 198 | 99 | 50 |
| November 2016 | 3530 | 528 | −1.1 | 180 | 94 | 52 |
| December 2016 | 3463 | 530 | −0.2 | 189 | 101 | 53 |
| January 2017 | 3617 | 530 | 0.1 | 196 | 107 | 55 |
| Febuary 2017 | 3473 | 529 | −1.2 | 186 | 101 | 54 |
| March 2017 | 3310 | 527 | 1.7 | 192 | 91 | 47 (1) |
| April 2017 | 3345 | 528 | 0.3 | 181 | 93 | 51 |
| May 2017 | 3575 | 529 | 2.4 | 193 | 102 | 53 |
| June 2017 | 3515 | 528 | 3.0 | 191 | 102 | 53 |
| Average (After) | | | | | | 52.0 |

MTPD—Metric tonnes per day (1) Pressure Swing Adsorption (PSA) section operated at high tail gas pressure due to turnaround of Train II units (hydrocracker and base oil unit)

Impact of APC on Reformer Utility Consumption

The net effect of the APC on utility consumption is given in the Table 9 below:

TABLE 9

| | | January-April 2016 Before APC | May 2016-June 2017 After APC | Difference |
|---|---|---|---|---|
| Fuel Fired | MTPD | 161.3 | 147.0 | −14.3 |
| Steam Consumption | MTPD | 384 | 319 | −65 |
| Power | MW | 7.32 | 7.04 | −0.28 |
| Hydrogen | MTPD | 126.30 | 133.27 | +6.97 |

Impact on Reformate Yield

Operation of the unit at lower weighted average inlet temperature resulted in consistent 2% increase in value added product, heavy reformate. The reformer product yield is tabulated in the Table 10 below:

TABLE 10

| | | January-April 2016 | May 2016-June 2017 | Difference |
|---|---|---|---|---|
| Reformer feed | MTPD | 3540 | 3508 | |
| WAIT | ° C. | 536 | 529 | |
| Fuel Gas | % wt. | 0.86 | 0.92 | 0.06 |
| LPG | % wt. | 3.4 | 2.3 | −1.1 |
| Light Reformate | % wt. | 6.1 | 5.2 | −0.9 |
| Middle Reformate | % wt. | 16.06 | 16.62 | +0.6 |
| Heavy Reformate | % wt. | 65.8 | 67.9 | +2.1 |
| Off gas | % wt. | 7.8 | 7.1 | −0.6 |
| Total | | 100.02 | 100.04 | |

The APC system of the present invention has been able to achieve this on a consistent basis, over a 14 month period, resulting in unit optimization irrespective of the feed quality.

Value Addition

Value addition, due to consistent operation of the reaction controller with the changed yield pattern is of the order of US$6.72 million per annum (₹ 45 crores per annum) while the utility benefit considering reduction in the recycle gas compressor steam consumption, reaction section fired heaters fuel fired, net gas compressor power and increase in hydrogen production is approximately US$6.07 million per annum (₹ 40.6 crores per annum). The Table 11 below shows the controller value addition

TABLE 11

| | | Difference | Cost ₹/Unit 2016-2017 | Benefit ₹Lakhs/Day |
|---|---|---|---|---|
| Fuel Gas | MTPD | 2.0 | 18712 | 0.37 |
| LPG | MTPD | −38.5 | 26903 | −10.4 |
| Light Reformate | MTPD | −32.4 | 28104 | −9.1 |
| Middle Reformate (1) Benzene @ 35.7% | MTPD | 7.08 | 46492 | 3.29 |
| Middle Reformate Toluene @ 12.3% | MTPD | 2.43 | 44228 | 1.07 |
| Middle Reformate Naphtha component | MTPD | 10.3 | 28104 | 2.90 |
| Heavy Reformate | MTPD | 74 | 37180 | 27.4 |
| Off gas (2) | MTPD | −10.9 | 18712 | −2.04 |
| Yield Benefit | ₹Lakh/D | | | 13.49 |
| Fuel Fired | MTPD | −14.3 | 18712 | −2.68 |
| Steam Consumption | MTPD | −65 | 2180 | −1.41 |
| Power | MW | −0.28 | 6830 | −0.46 |
| | | | | 4.55 |
| Hydrogen Production | MTPD | +6.97 | 109641 | 7.64 |
| Utility Benefit | ₹Lakhs/D | | | 12.19 |

| | | Benefit |
|---|---|---|
| Yield Benefit | ₹Lakhs/D | 13.49 |
| Yield Benefit (3) | Million US$/A | 6.72 |
| Utility Benefit | ₹Lakhs/D | 12.19 |
| Utility Benefit (3) | Million US$/A | 6.07 |

₹Indian Currency (INR)
(1) Middle Reformate is feed to Aromatics Recovery Unit
(2) Fuel gas part (@ 48%) of off gas
(3) Considering conversion rate of 1 US$ = ₹66.84 and 333 days of operation in a year All in all, the APC operation of the present invention is accruing a saving of 13.12 cents per barrel of crude processed in the refinery (₹ 85.6 crores per annum).

The regeneration controller strategy was implemented after necessary tuning of DCS PID controllers, step test, model building and model acceptance test. Operation of the regeneration section APC, since December 2016, has shown consistent improvement in carbon burn, rejuvenation, reduction, water-chloride balance, lift velocity etc.:

a) Carbon Burn

Figure 13:
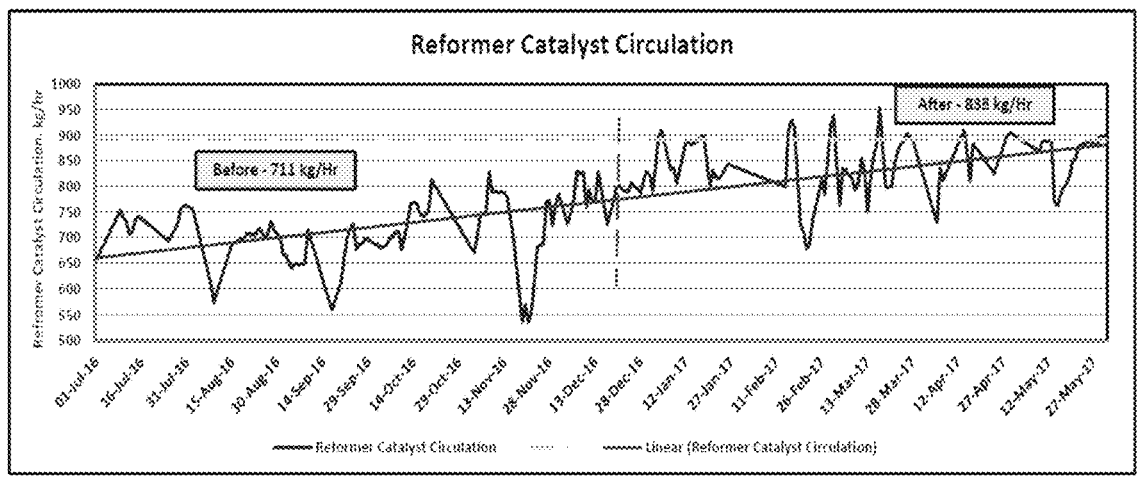
FIG. 13 illustrates the sustained operation of reformer at a higher catalyst circulation rate due to the advanced process controller operation
Figure 14:
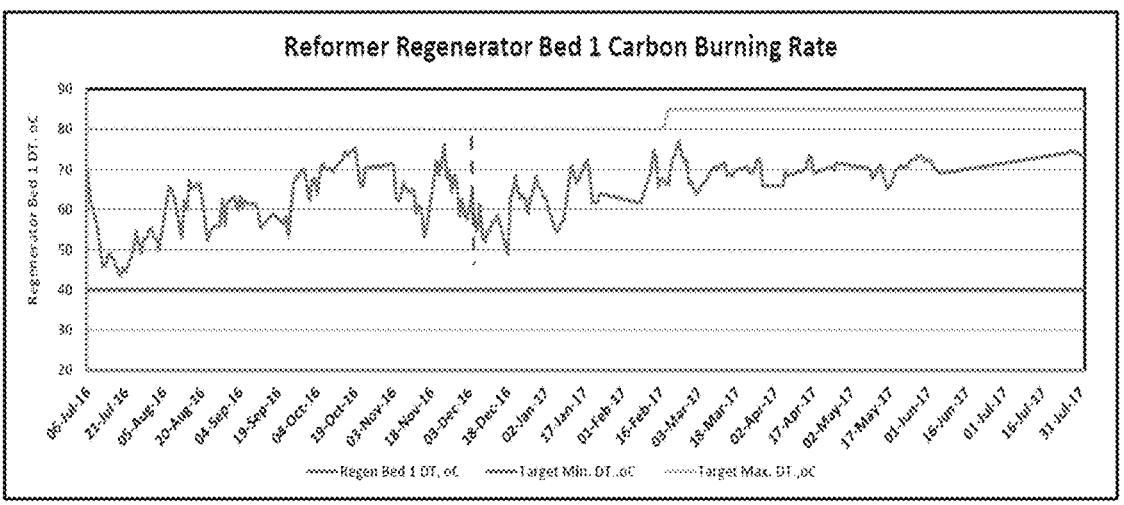
FIG. 14 illustrates the sustained operation of the regenerator $1^{st}$ bed at a higher carbon burning rate due to the advanced process controller operation
Figure 15:
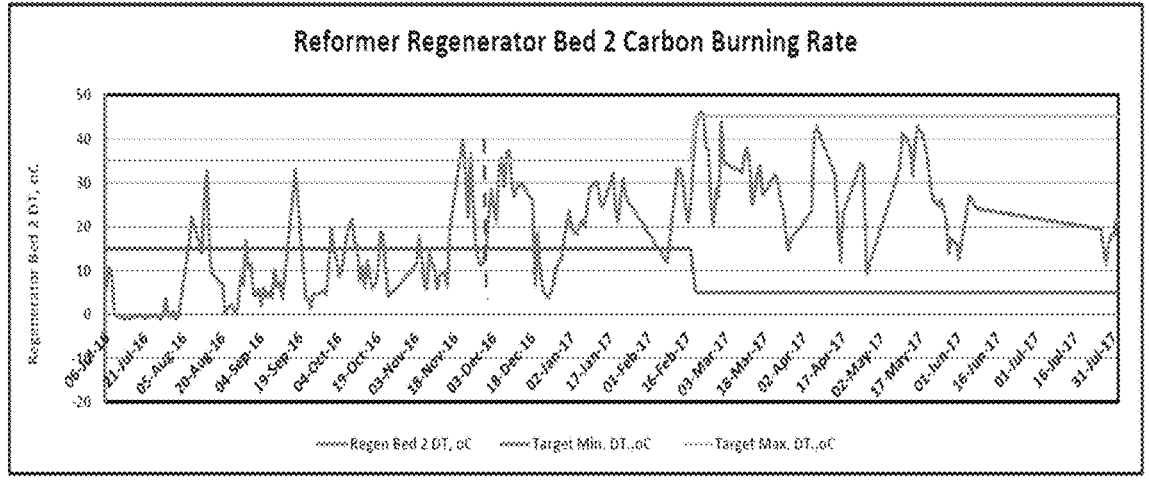
FIG. 15 illustrates the sustained operation of the regenerator $2^{nd}$ bed at a certain minimum carbon burning rate due to the advanced process controller operation

As illustrated in FIG. 13 of the present invention, the APC has been successful in consistently operating at a higher (around 130 kilograms per hour) catalyst circulation rate. The APC has also been able to increase the coke burning rate in the $1^{st}$ burning bed of the regenerator while keeping the bed and bed outlet temperatures within their operating limits, as shown in FIG. 14 of the present invention. More the amount of coke being burnt in the regenerator (higher catalyst circulation rate) and higher the burning rate (higher $1^{st}$ bed differential temperature), more the scope for increasing reformer feed and reformer operating severity (reactor temperature) resulting in higher heavy reformate octane barrel generation.

b) Secondary Burn

The APC has been able to maintain a minimum burning rate in the $2^{nd}$ burning bed of the regenerator. As the $2^{nd}$ bed differential temperature has been increased from less than 5° C. to more than 10° C., it ensures that no coke slips into the oxychlorination zone of the regenerator. No coke slippage reduces the possibility that the regenerator goes from 'white burn' to 'black burn', the unsteady state, where the catalyst is not rejuvenated and the heavy reformate octane barrel deteriorates.

c) Catalyst Rejuvenation

FIG. 16 and FIG. 17 of the present invention illustrates that the temperature in the oxychlorination and calcination zones of the regenerator were controlled 13° C. to 14° C. higher than before the implementation of APC.

Figure 18:
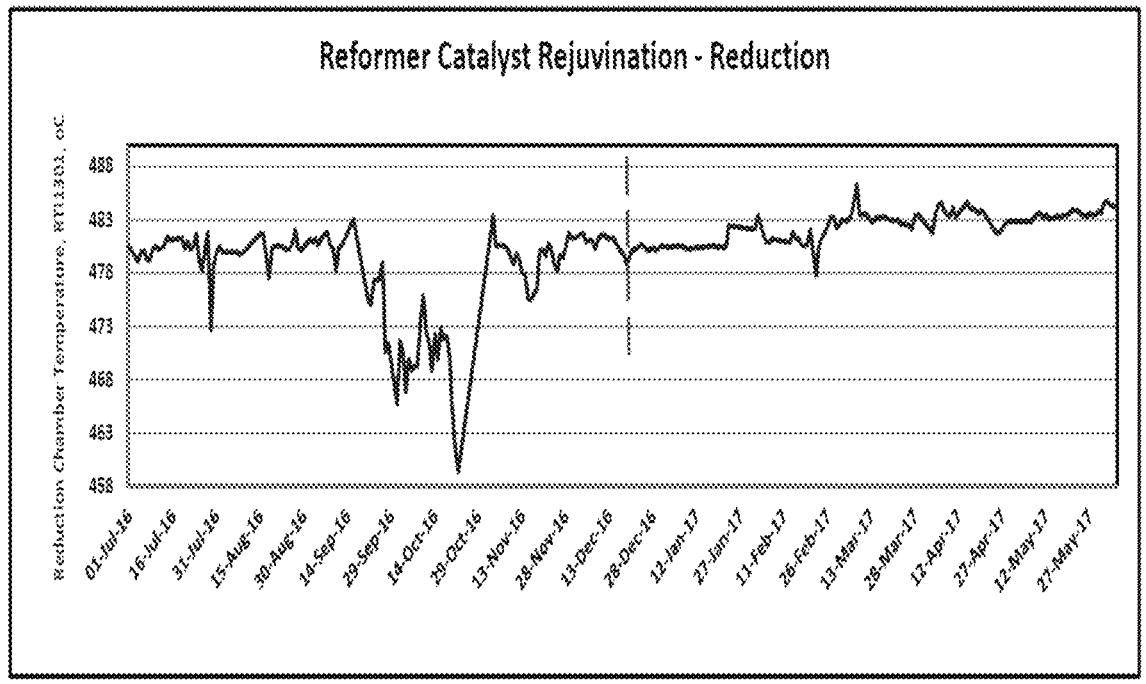

The temperature in the reduction zone was also maintained closer to the desired limit of 480° C., as shown in the FIG. 18 of the present invention. Further, FIG. 19 of the present invention illustrates that the APC has also ensured that the oxygen content in the calcination zone of the regenerator is closer to the desired limit of 8% volume. Control of oxychlorination, calcination and reduction zone temperatures and oxygen in the calcination zone closer to their desired limit improves the rejuvenation of catalyst i.e. proper re-dispersion of noble metal, platinum, on the base catalyst, impregnation of adequate amount of chloride in a high oxygen atmosphere, all of which increases heavy reformate octane barrel.

d) Reformer Recycle Gas Moisture Control

Figure 20:
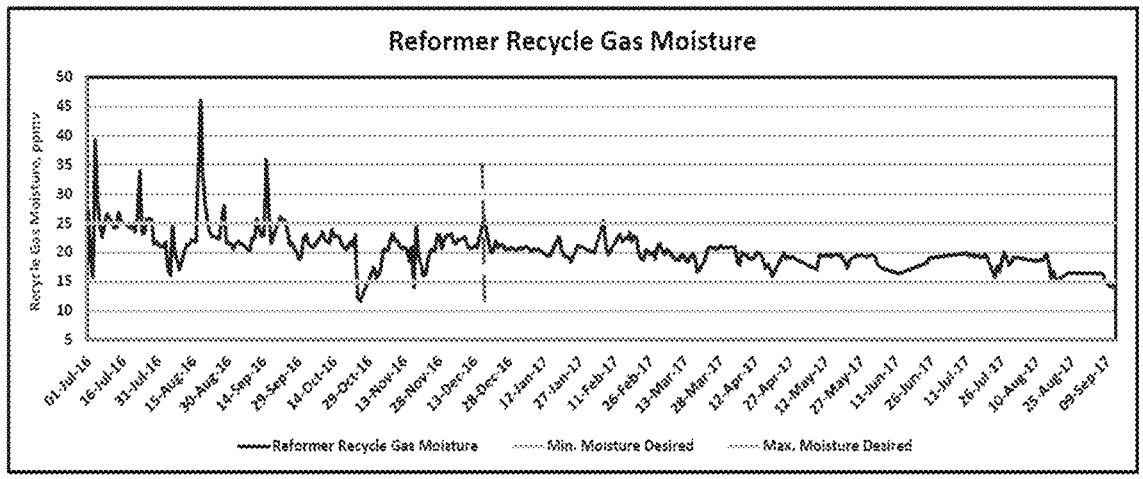
FIG. 20 illustrates the controller of the reformer recycle gas moisture in the desired range due to the advanced process controller operation

The APC of the present invention has been able to control recycle gas moisture in the desired range, unlike the spikes observed before the implementation of APC, as shown in the FIG. 20 of the present invention. Thus the APC was able to control the water-chloride balance on the catalyst which governs the reforming reaction i.e. formation of desirable product—reformate—and control the production of undesirable byproducts like off gas and liquefied petroleum gas.

e) Catalyst Attrition

FIG. 21 of the present invention shows that the APC has been able to reduce the lift velocities from around 3.0-3.5 meters per second (m/s) to the desired range of 2.0 m/s and maintain it consistently at that level. The lift velocity of one of the lifts, the $4^{th}$ one, which used to be more than 10.0 m/s was reduced to 3.0 m/s. The average catalyst make-up rate, in the CCR reformer, in the year 2016 was 248 kilograms per month. Post the implementation of APC in the regeneration section, the average catalyst make-up rate has been reduced to 231 kilograms per month. This amounts to 17 kilogram per month reduction in consumption of the reformer catalyst, accruing a benefit of ₹ 0.22 crores per annum (US$32,205 per annum). This reduction in lift velocities did not only reduce catalyst attrition and thereby catalyst consumption but would also avoid any buildup of pressure drop across the reactors.

While specific language has been used to describe the disclosure, any limitations arising on account of the same are not intended. As would be apparent to a person in the art, various working modifications may be made to the method to implement the inventive concept as taught herein. The scope of the embodiments is by no means limited by these specific examples. The scope of the embodiments is at least as broad as given by the following claims.

The invention claimed is:

1. An advanced process control system in a continuous catalytic regeneration reformer for maintaining heavy reformate octane number and maximizing heavy reformate octane barrel while controlling coke on spent catalyst, said system comprising:
   a master-slave configuration, comprising:
      a master advanced process controller configured to:
         predict coke on spent-catalyst based on an online inferential; an empirical tool; and
         specify a set point for at least one of: a) hydrogen to hydrocarbon ($H_2$/HC) ratio in respect of a reaction-section, and b) catalyst circulation rate in respect of a regeneration-section;
      a reactor advanced process controller to at-least optimize a control ratio of $H_2$/HC within the reaction-section based on the set point specified by the master advance process controller; and
      a regenerator advanced process controller to at-least optimize the catalyst circulation rate within the regeneration-section based on the set point specified by the master advance process controller;
   wherein, the reactor advanced process controller and the regenerator advanced process controller are linked to the master controller.

2. The system as claimed in claim 1, wherein slave-elements of the master-slave configuration are advanced process controllers for the reaction-section and the regeneration-section.

3. The system as claimed in claim 1, wherein the set point of the ratio in the range of about 0.0 to 1.0 of the hydrogen to hydrocarbon ratio ($H_2$/HC) is passed on from the master advanced process controller to the reactor advanced process controller; while the set point of the catalyst circulation is passed on from the master advanced process controller to the regenerator advanced process controller.

4. The system as claimed in claim 3, wherein the master-slave configuration optimizes the catalyst circulation rate by increasing the catalyst circulation rate by 130 kg/hour.

5. The system as claimed in claim 1, wherein the master-slave configuration controls the coke on spent catalyst in range of 4.5 to 5.5 wt. %.

6. The system as claimed in claim 1, wherein the master advanced process controller executes every 10 minutes; and the reactor advanced process controller and the regenerator advanced process controller are executed every minute.

7. The system as claimed in claim 1, wherein the regenerator advanced process controller maintains 5 to 10° C. higher coke burning temperature in a first bed of a regenerator.

8. The system as claimed in claim 1, wherein the regenerator advanced process controller maintains a minimum coke burning temperature of 10° C. in a second bed of the regenerator.

9. The system as claimed in claim 1, wherein the regenerator advanced process controller controls an oxychlorination zone temperature at an increment of 10 to 15° C.

10. The system as claimed in claim 1, wherein the regenerator advanced process controller controls a calcination zone temperature within a calcination zone at an increment of 10 to 20° C., and wherein the regenerator advanced process controller controls an oxygen content in the calcination zone at an increment of 1.0 to 1.5% volume.

11. The system as claimed in claim 1, wherein the regenerator advanced process controller controls catalyst reduction temperature at an increment of 5° C.

12. The system as claimed in claim 1, wherein the regenerator advanced process controller controls catalyst lift velocities in the range of 2.0 to 3.0 meters/second.

13. The system as claimed in claim 1, wherein the system controls water-chloride balance on a catalyst in a reactor section.

14. The system as claimed in claim 1, wherein the reactor advanced process controller controls methane content in a hydrogen product at the outlet of a Pressure Swing Adsorption (PSA) unit.

15. The system as claimed in claim 1, wherein the master-slave configuration controls coke on spent catalyst, using an online inferential built without any time lag.

16. The system as claimed in claim 1, wherein interlocks are built within the system to take conducive action, to avoid reverse action, to change the control from supervisory to supervisor in case of plant exigencies, and/or to detect faulty analyzers; and wherein the control changes from supervisory to supervisor mode when a Distributed Control System (DCS) interlock is triggered.

17. The system as claimed in claim 1, wherein the regenerator advanced process controller manipulates the outlet temperature of electric heaters 5 to 10° C. in a primary burn heater; 10 to 15° C. in a reduction heater; 30 to 35° C. in an oxychlorination zone heater; 30 to 35° C. in a calcination zone heater.

18. The system as claimed in claim 1, wherein:
the reformer advanced process controller takes appropriate action, by decreasing the reactor weighted average inlet temperature, in case of sulfur poisoning of the reformer catalyst; or
the reformer advanced process controller avoids reverse action in case of change in feed quality with respect to naphthenes and aromatics content.

19. The system as claimed in claim 1, wherein: the reactor advanced process controller varies a weighted average inlet temperature (WAIT) in a range of 8 to 10° C., or the reactor advanced process controller WAIT maintains heavy reformate octane number in the range of 105 to 106 and maximizes octane barrel; or the reactor advanced process controller consistently maintains an incremental reformate yield in a range of 1% to 2%; or the reactor advanced process controller manipulates a speed of a steam driven recycle gas compressor to optimize a ratio of hydrogen to hydrocarbon by reducing it in a range of 0.3 to 0.4; or the reactor advanced process controller controls production of hydrogen product at a rate of 3%-5% higher than before implementation of advanced process control; or the reactor advanced process controller controls a higher heavy reformate and hydrogen yield even with 10% to 15% variation in feed naphthenes and aromatics content; or the reactor advanced process controller consistently operates at a lower fuel fired at about 0.7% wt. on feed relative to before implementation of advanced process control; or the reactor advanced process controller consistently operates at a lower steam consumption at about 65 metric tons per day (MTPD) than before implementation of advanced process control.

20. A process comprising:
reforming of a hydrocarbon feed in a reformer reactor in the presence of a reforming catalyst to obtain a product stream and a spent catalyst stream; and
regeneration of the spent catalyst in a regenerator to obtain a regenerated catalyst;
wherein:
one or more of a plurality of operating parameters in the reactor are controlled by a first controller at-least by optimizing a control ratio of hydrogen and hydrocarbon ($H_2$/HC) based on a set-point and one or more of a plurality of operating parameters in the regenerator are controlled by a second controller at-least by optimizing a catalyst circulation rate based on the set point,
and
wherein, the first controller and the second controller are controlled as slave-elements by a master controller.

* * * * *